United States Patent
Abotabl et al.

(10) Patent No.: US 12,395,209 B2
(45) Date of Patent: Aug. 19, 2025

(54) MULTIPLE-INPUT MULTIPLE-OUTPUT LAYER ADAPTATION

(71) Applicant: QUALCOMM Incorporated, San Diego, CA (US)

(72) Inventors: Ahmed Attia Abotabl, San Diego, CA (US); Hung Dinh Ly, San Diego, CA (US); Muhammad Sayed Khairy Abdelghaffar, San Jose, CA (US)

(*) Notice: Subject to any disclaimer, the term of this patent is extended or adjusted under 35 U.S.C. 154(b) by 347 days.

(21) Appl. No.: 17/931,144

(22) Filed: Sep. 12, 2022

(65) Prior Publication Data

US 2024/0088948 A1  Mar. 14, 2024

(51) Int. Cl.
*H04B 7/024* (2017.01)
*H04B 7/0413* (2017.01)
(Continued)

(52) U.S. Cl.
CPC .......... *H04B 7/0413* (2013.01); *H04B 7/024* (2013.01); *H04L 5/0051* (2013.01); *H04L 5/0098* (2013.01); *H04W 8/22* (2013.01); *H04W 72/23* (2023.01); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC .. H04B 7/02–12; H04B 17/0082–3913; H04L 1/0001–0693; H04L 5/00–0098; H04W 8/22–245; H04W 24/02–10; H04W 48/02–20; H04W 52/02–60; H04W 72/02–569; H04W 74/002–006; H04W 84/02–16; H04W 88/02–12; H04W 92/02–04; H04W 92/10; Y02D 30/70
See application file for complete search history.

(56) References Cited

U.S. PATENT DOCUMENTS

| | | | |
|---|---|---|---|
| 2019/0260428 A1* | 8/2019 | Hugl | H04B 7/0417 |
| 2021/0105108 A1* | 4/2021 | Abdelghaffar | H04B 7/0413 |

(Continued)

FOREIGN PATENT DOCUMENTS

| | | | | |
|---|---|---|---|---|
| WO | WO-2017048049 A1 * | 3/2017 | | H04B 7/0413 |
| WO | 2018084971 A1 | 5/2018 | | |
| WO | WO-2021133705 A1 * | 7/2021 | | H04W 52/0235 |

OTHER PUBLICATIONS

Samsung: "UE Adaptation to Maximum Number of MIMO Layers," 3GPP TSG RAN WG1 #99, R1-1912488, Reno, USA, Nov. 18-22, 2019, (Nov. 22, 2019), the whole document, 4 pages.

(Continued)

*Primary Examiner* — Timothy J Weidner

(57) ABSTRACT

Various aspects of the present disclosure generally relate to wireless communication. In some aspects, a user equipment (UE) may identify a maximum number of multiple-input multiple-output (MIMO) layers for a communication based at least in part on at least one of a number of channel state information reference signal (CSI-RS) ports associated with a network node, or a transition of a transmission reception point (TRP) associated with the network node to or from a dormancy state. The UE may perform the communication in accordance with the maximum number of MIMO layers. Numerous other aspects are described.

30 Claims, 14 Drawing Sheets

(51) Int. Cl.
    *H04L 5/00*     (2006.01)
    *H04W 8/22*     (2009.01)
    *H04W 72/23*     (2023.01)
    *H04W 84/02*     (2009.01)
    *H04W 88/02*     (2009.01)
    *H04W 88/08*     (2009.01)
    *H04W 92/02*     (2009.01)
    *H04W 92/10*     (2009.01)

(56) References Cited

U.S. PATENT DOCUMENTS

| | | | |
|---|---|---|---|
| 2021/0242913 A1 | 8/2021 | Manolakos et al. | |
| 2021/0345315 A1* | 11/2021 | Kakishima | H04B 7/0486 |
| 2021/0352580 A1 | 11/2021 | Zhou et al. | |
| 2021/0377852 A1* | 12/2021 | Zhou | H04W 52/0235 |

OTHER PUBLICATIONS

International Search Report and Written Opinion—PCT/US2023/073075—ISA/EPO—Dec. 19, 2023.

\* cited by examiner

MULTIPLE-INPUT MULTIPLE-OUTPUT LAYER ADAPTATION

FIELD OF THE DISCLOSURE

Aspects of the present disclosure generally relate to wireless communication and to techniques and apparatuses for multiple-input multiple-output (MIMO) layer adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying a maximum number of multiple-input multiple-output (MIMO) layers for a communication based at least in part on at least one of a number of channel state information reference signal (CSI-RS) ports associated with a network node, or a transition of a transmission reception point (TRP) associated with the network node to or from a dormancy state. The method may include performing the communication in accordance with the maximum number of MIMO layers.

Some aspects described herein relate to a method of wireless communication performed by a network node. The method may include transmitting at least one of: information indicating a number of CSI-RS ports associated with the network node, or information indicating a transition of a TRP associated with the network node to or from a dormancy state. The method may include performing a communication in accordance with a maximum number of MIMO layers, wherein the maximum number of MIMO layers is based at least in part on at least one of the number of CSI-RS ports or the transition of the TRP to the dormancy state.

Some aspects described herein relate to an apparatus of a UE for wireless communication. The apparatus may include a memory and one or more processors coupled to the memory. The one or more processors may be configured to identify a maximum number of MIMO layers for a communication based at least in part on at least one of a number of CSI-RS ports associated with a network node, or a transition of a TRP associated with the network node to or from a dormancy state. The one or more processors may be configured to perform the communication in accordance with the maximum number of MIMO layers.

Some aspects described herein relate to a network node for wireless communication. The network node may include a memory and one or more processors coupled to the memory. The one or more processors may be configured to transmit at least one of: information indicating a number of CSI-RS ports associated with the network node, or information indicating a transition of a TRP associated with the network node to or from a dormancy state. The one or more processors may be configured to perform a communication in accordance with a maximum number of MIMO layers, wherein the maximum number of MIMO layers is based at least in part on at least one of the number of CSI-RS ports or the transition of the TRP to the dormancy state.

Some aspects described herein relate to a non-transitory computer-readable medium that stores a set of instructions for wireless communication by a UE. The set of instructions, when executed by one or more processors of the UE, may cause the UE to identify a maximum number of MIMO layers for a communication based at least in part on at least one of a number of CSI-RS ports associated with a network node, or a transition of a TRP associated with the network node to or from a dormancy state. The set of instructions, when executed by one or more processors of the UE, may cause the UE to perform the communication in accordance with the maximum number of MIMO layers.

Some aspects described herein relate to a non-transitory computer-readable medium that stores a set of instructions for wireless communication by a network node. The set of instructions, when executed by one or more processors of the network node, may cause the network node to transmit at least one of: information indicating a number of CSI-RS ports associated with the network node, or information indicating a transition of a TRP associated with the network node to or from a dormancy state. The set of instructions, when executed by one or more processors of the network node, may cause the network node to perform a communication in accordance with a maximum number of MIMO layers, wherein the maximum number of MIMO layers is based at least in part on at least one of the number of CSI-RS ports or the transition of the TRP to the dormancy state.

Some aspects described herein relate to an apparatus for wireless communication. The apparatus may include means for identifying a maximum number of MIMO layers for a communication based at least in part on at least one of a number of CSI-RS ports associated with a network node, or a transition of a TRP associated with the network node to or from a dormancy state. The apparatus may include means for performing the communication in accordance with the maximum number of MIMO layers.

Some aspects described herein relate to an apparatus for wireless communication. The apparatus may include means for transmitting at least one of: information indicating a number of CSI-RS ports associated with the network node, or information indicating a transition of a TRP associated with the network node to or from a dormancy state. The apparatus may include means for performing a communication in accordance with a maximum number of MIMO layers, wherein the maximum number of MIMO layers is based at least in part on at least one of the number of CSI-RS ports or the transition of the TRP to the dormancy state.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
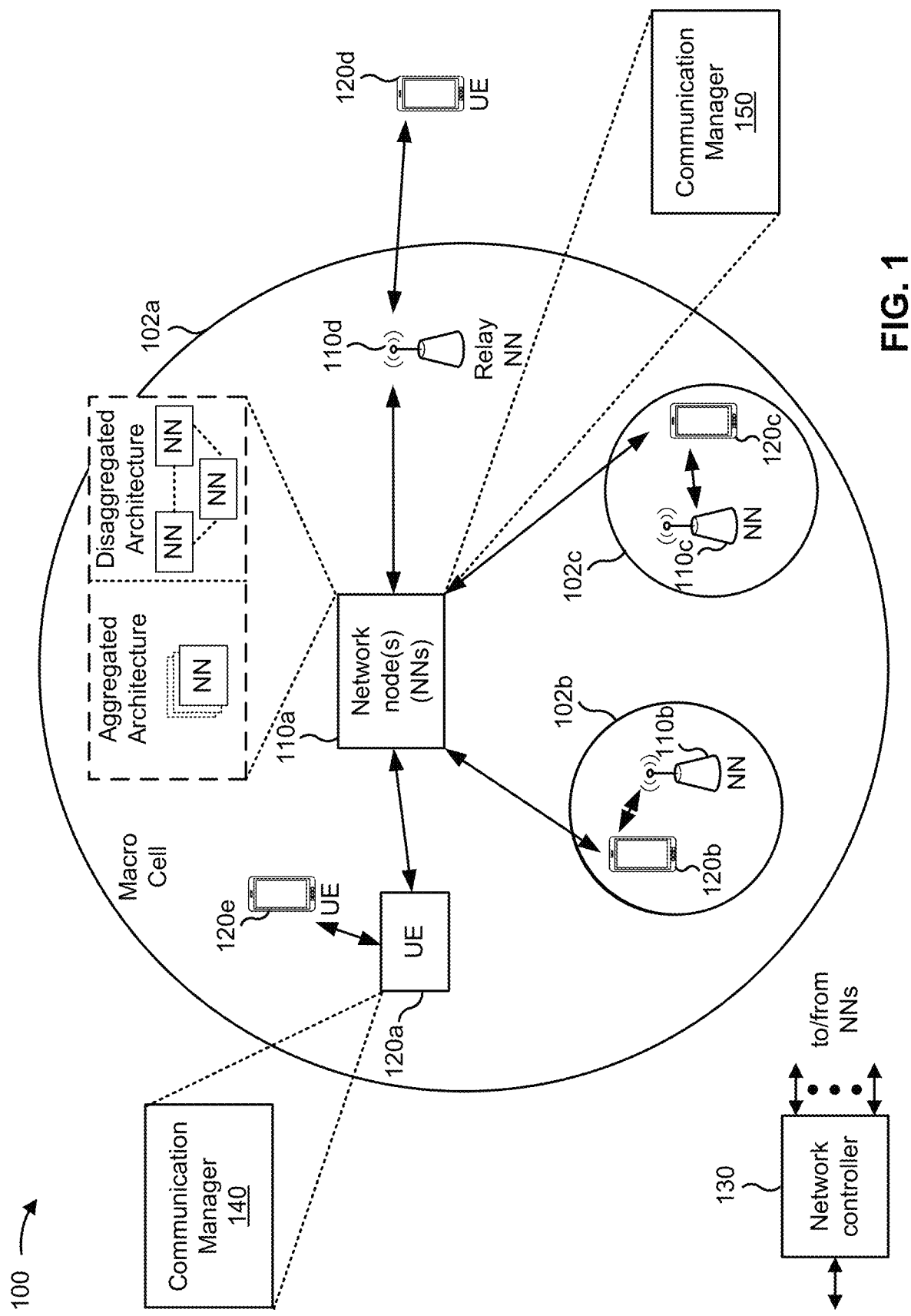
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node). In some examples, "cell" can refer to a carrier, such as a component carrier of a carrier aggregation configuration (e.g., a primary cell, a secondary cell, etc.). In some examples, "cell" can refer to a TRP.

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a maximum number of multiple-input multiple-output (MIMO) layers for a communication based at least in part on at least one of a number of channel state information reference signal (CSI-RS) ports associated with a network node, or a transition of a transmission reception point (TRP) associated with the network node to or from a dormancy state; and perform the communication in accordance with the maximum number of MIMO layers. Additionally, or alternatively, the communication manager 140 may perform one or more other operations described herein.

In some aspects, the network node may include a communication manager 150. As described in more detail elsewhere herein, the communication manager 150 may transmit at least one of: information indicating a number of CSI-RS ports associated with the network node, or information indicating a transition of a TRP associated with the network node to or from a dormancy state; and perform a communication in accordance with a maximum number of MIMO layers, wherein the maximum number of MIMO layers is based at least in part on at least one of the number of CSI-RS ports or the transition of the TRP to the dormancy state. Additionally, or alternatively, the communication manager 150 may perform one or more other operations described herein.

As indicated above, FIG. 1 is provided as an example. Other examples may differ from what is described with regard to FIG. 1.

Figure 2:
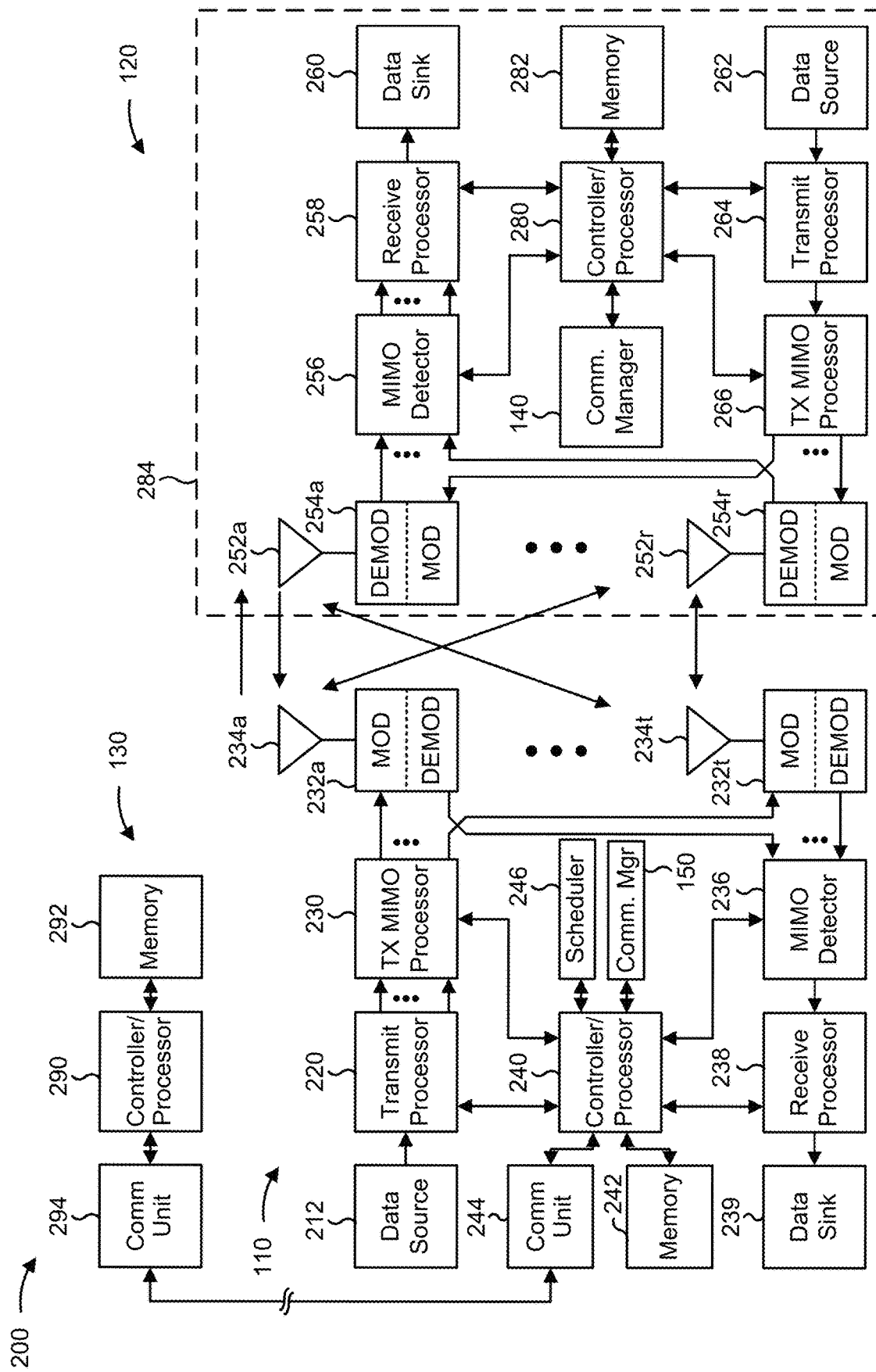
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-14).

The controller/processor 240 of the network node 110, the controller/processor 280 of the UE 120, and/or any other component(s) of FIG. 2 may perform one or more techniques associated with MIMO communication, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for identifying a maximum number of multiple-input multiple-output (MIMO) layers for a communication based at least in part on at least one of a number of channel state information reference signal (CSI-RS) ports associated with a network node, or a transition of a transmission reception point (TRP) associated with the network node to or from a dormancy state; and/or means for performing the communication in accordance with the maximum number of MIMO layers. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting at least one of: information indicating a number of CSI-RS ports associated with the network node, or information indicating a transition of a TRP associated with the network node to or from a dormancy state; and/or means for performing a communication in accordance with a maximum number of MIMO layers, wherein the maximum number of MIMO layers is based at least in part on at least one of the number of CSI-RS ports or the transition of the TRP to the dormancy state. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
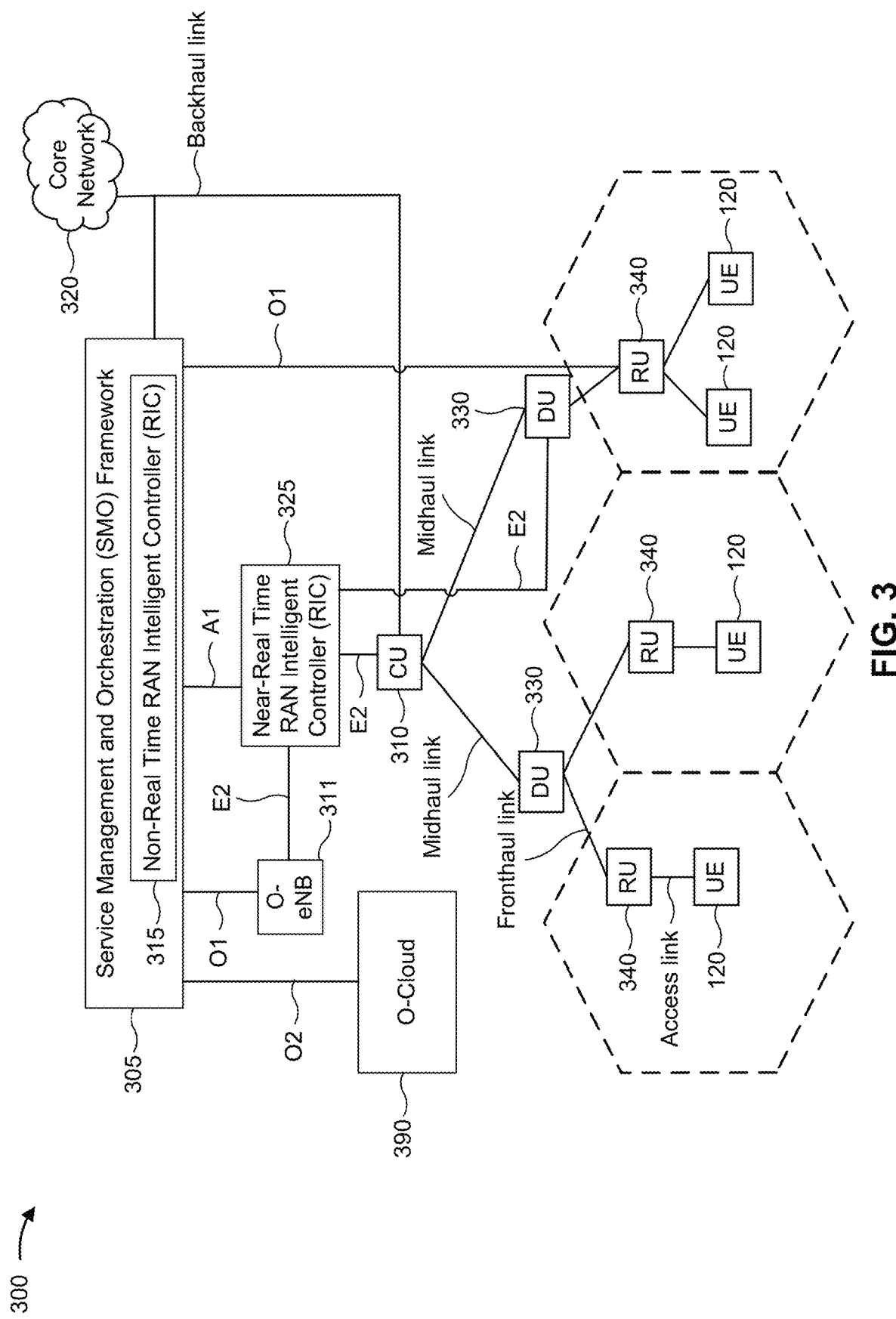
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
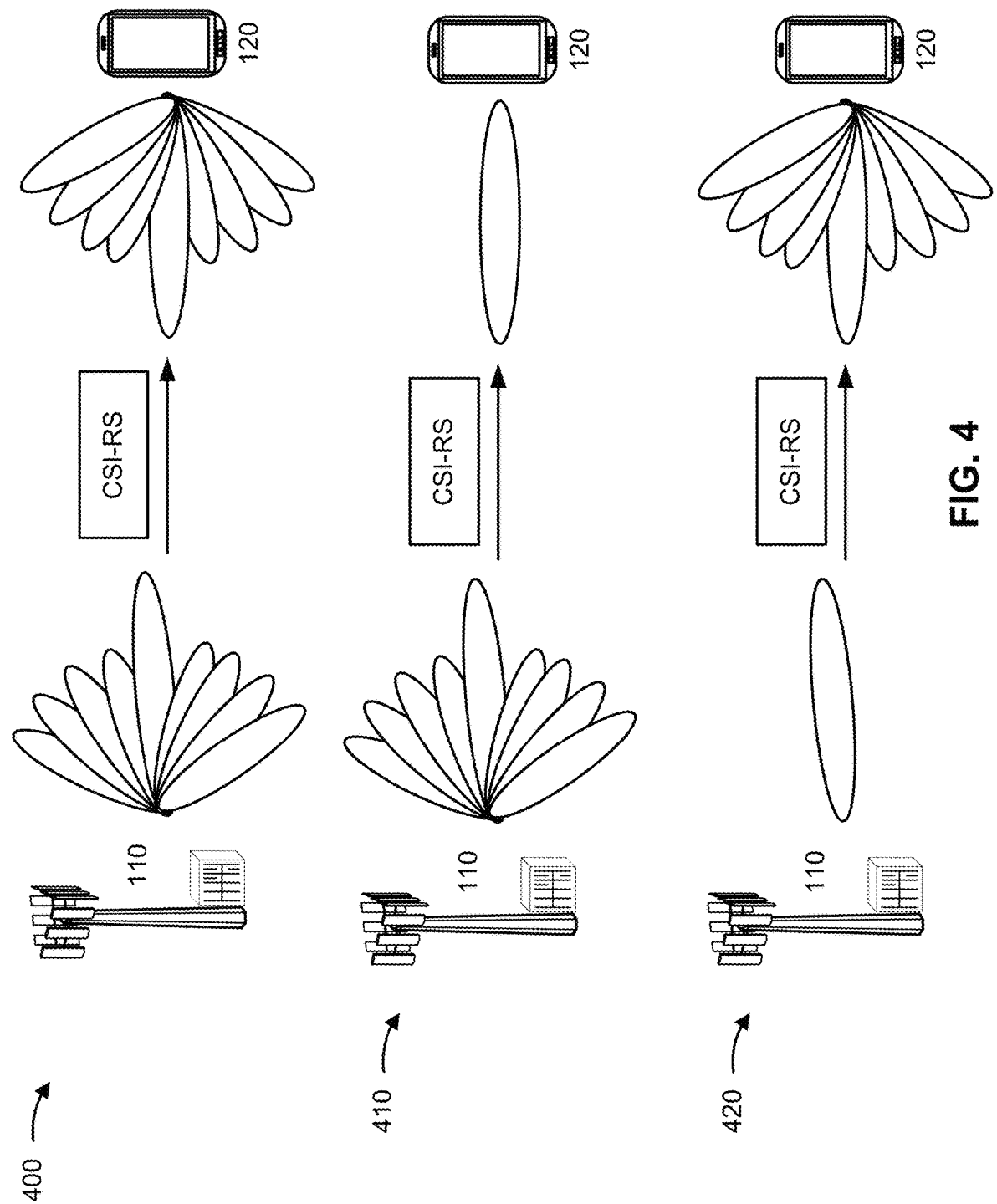
FIG. 4 is a diagram illustrating examples of channel state information reference signal (CSI-RS) beam management procedures, in accordance with the present disclosure.

FIG. 4 is a diagram illustrating examples 400, 410, and 420 of CSI-RS beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or transmission reception point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

The above description of CSI-RS measurement relates to beam management procedures using CSI-RSs. CSI-RSs can also be used for other purposes, such as CSI reporting (in which the UE provides CSI reports to the network based at least in part on measurements of the CSI-RS), mobility (in which the UE is triggered to report a measurement that triggers handover of the UE), radio link failure detection, interference measurement, and synchronization.

A CSI-RS can be transmitted using a number of antenna ports. For example, different physical antennas of a transmitter may transmit information via different channels (where, in this context, a channel represents the signal path and propagation characteristics encountered by a signal transmitted or received by a physical antenna). Such information may be conveyed via a logical antenna port, which may represent some combination of the physical antennas and/or channels. In some cases, a transmitter or a receiver may not have knowledge of the channels associated with the physical antennas, and may only operate based on knowledge of the channels associated with antenna ports, as defined below. An antenna port may be defined such that a channel, over which a symbol on the antenna port is conveyed, can be inferred from a channel over which another symbol on the same antenna port is conveyed. Weighting factors may be applied to the channels associated with a set of antennas to improve signal power and/or signal quality at one or more receivers. Applying such weighting factors to channel transmissions may be referred to as precoding, and "precoder" may refer to a specific set of weighting factors applied to a set of channels. A CSI-RS is configured with a number of CSI-RS ports. As used herein, "CSI-RS port" refers to an antenna port used for CSI-RS transmission or reception. For example, a higher layer (e.g., RRC) parameter may indicate a number of CSI-RS ports configured for a CSI-RS such as an nrofPorts parameter in a CSI-RS-ResourceMapping information element (IE). In some aspects described herein, a network node may increase or decrease the number of CSI-RS ports used for CSI-RS transmission, such as for the purpose of power saving. Techniques described herein provide adaptation of a maximum number of MIMO layers based at least in part on a change in the number of CSI-RS ports used for CSI-RS transmission (among other examples).

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
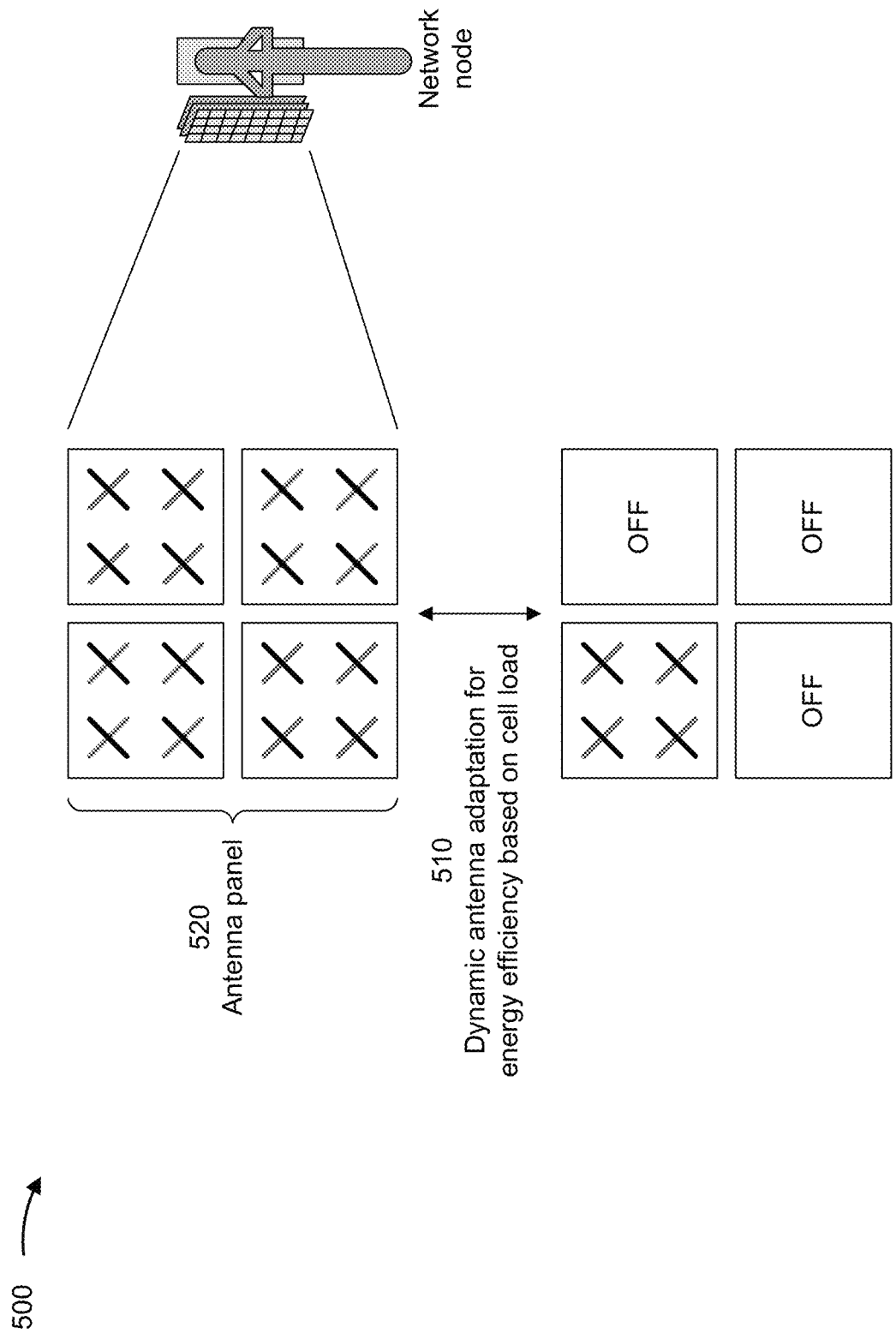
FIG. 5 is a diagram illustrating an example of dynamic network-side antenna adaptation, in accordance with the present disclosure.

FIG. 5 is a diagram illustrating an example 500 of dynamic network-side antenna adaptation, in accordance with the present disclosure.

For various reasons, including climate change mitigation and network cost reduction, energy-saving and/or energy efficiency measures are expected to have increasing importance in wireless network operations. For example, although NR generally offers a significant energy-efficiency improvement per gigabyte over previous generations (e.g., LTE), new NR use cases and/or the adoption of millimeter wave frequencies require more network sites and more network antennas, which could potentially lead to a more efficient cellular network that nonetheless has higher energy requirements and/or causes more emissions than previous generations owing to increased traffic. Furthermore, energy accounts for a significant proportion of the cost to operate a cellular network. For example, according to some estimates, energy costs are nearly 23% of the total cost to operate a cellular network, with selling, general, and administrative (SG&A) expenses and other costs accounting for about 75%, and over 90% of network operating costs are spent on energy (e.g., fuel and electricity consumption). Most energy consumption and/or energy costs are associated with powering a radio access network (RAN), which accounts for about 50% of the energy consumed by a wireless network, with data centers and fiber transport accounting for smaller shares. Accordingly, measures to increase energy savings and/or energy efficiency in a wireless network are important factors that may drive adoption and/or expansion of cellular networks.

One way to increase energy efficiency in a RAN may be to use dynamic antenna adaptation in a base station that communicates using massive MIMO technology, which tends to consume significant power. For example, in an LTE network, a base station that supports massive MIMO technology may communicate using a baseband unit (BBU) that processes baseband signals and communicates with a core network through a physical interface and a remote radio unit (RRU) that performs transmit and receive radio frequency (RF) functions. In an LTE network, the per-cell power consumption (e.g., in watts) is slightly larger for the RRU compared to the BBU, and the per-cell power consumption does not vary significantly with cell load. In an NR network, however, a base station that supports massive MIMO technology may communicate using a BBU and an active antenna unit (AAU) that consumes significantly more power than the BBU and the RRU in an LTE base station (e.g., because NR operates at a higher data rate and/or a higher bandwidth than LTE). For example, the BBU and the AAU in an NR base station may consume 2.4 times the power of the BBU and RRU in an LTE base station when the cell load is low (e.g., 0%), 2.6 times the power of the BBU and RRU in an LTE base station when the cell load is moderate (e.g., 50%), or 3 times the power of the BBU and RRU in an LTE base station when the cell load is high (e.g., 100%), where "cell load" generally refers to the proportion of frequency resources within a carrier that are being utilized at a given time. Furthermore, in an NR base station, the AAU generally consumes more power than the BBU, and the proportion of power consumption attributable to the AAU increases as the cell loading increases (e.g., because the BBU has a relatively static power consumption regardless of cell loading). Accordingly, in an NR base station that supports massive MIMO technology, the AAU represents the most power-hungry component.

Accordingly, as shown in FIG. 5, and by reference number 510, a base station that supports massive MIMO communication may enable dynamic antenna adaptation based on a current and/or predicted cell load in order to improve energy efficiency. For example, to enable massive MIMO communication, a base station may generally need to have multiple co-located antenna panels that each include multiple antenna ports. For example, in FIG. 5, reference number 520 depicts an example antenna panel that includes four (4) sub-panels, each of which includes several antenna ports (shown as gray and black intersecting lines) that each map to one or more physical antennas, where each diagonal line in FIG. 5 corresponds to one (1) antenna port. In general, each antenna panel is equipped with various power amplifiers and an antenna subsystem, which consume significant power. Accordingly, in order to save power or otherwise utilize energy more efficiently, the base station may dynamically adapt an antenna configuration based on a current and/or predicted cell load. For example, when the cell load is high, the base station may turn all (or most) antenna panels, sub-panels, and/or ports on to increase capacity, and the base station may turn off some antenna panels, sub-panels, and/or ports to reduce energy consumption when the cell load is low. Dynamically adapting the base station's antenna configuration may impact MIMO communication performance of the network node, since the number of MIMO layers supportable by a communication link is generally related to the number of antenna ports used to communicate on the communication link (e.g., a larger number of antenna ports may support a larger number of MIMO layers). Techniques described herein provide adaptation of a maximum number of MIMO layers based at least in part on dynamic antenna adaptation, such as based at least in part on a number of CSI-RS ports active at the network node (among other examples).

As indicated above, FIG. 5 is provided as an example. Other examples may differ from what is described with regard to FIG. 5.

Figure 6:
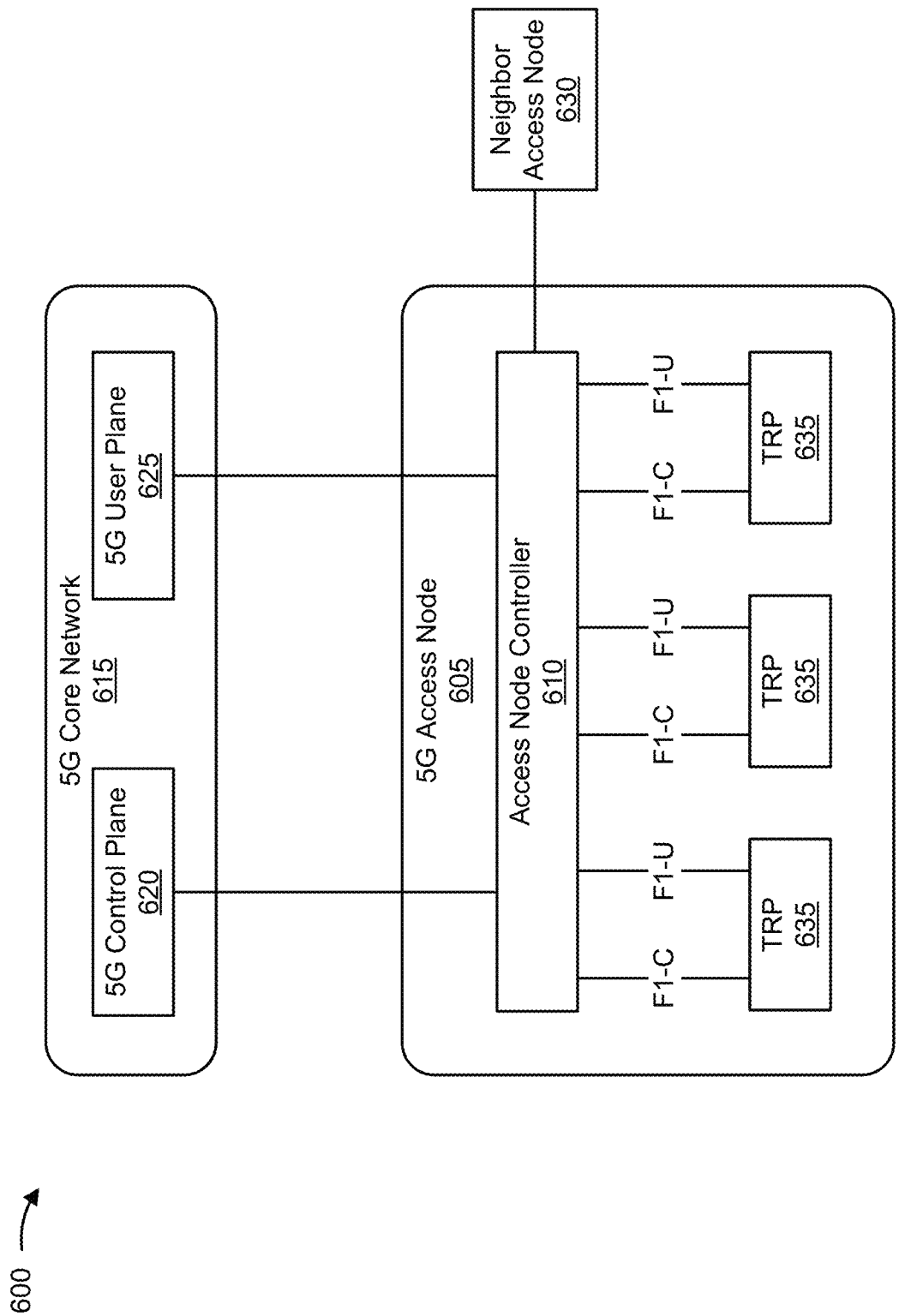
FIG. 6 illustrates an example logical architecture of a distributed radio access network (RAN), in accordance with the present disclosure.

FIG. 6 illustrates an example logical architecture of a distributed RAN 600, in accordance with the present disclosure.

A 5G access node 605 may include an access node controller 610. The access node controller 610 may be a central unit (CU) of the distributed RAN 600. In some aspects, a backhaul interface to a 5G core network 615 may terminate at the access node controller 610. The 5G core network 615 may include a 5G control plane component 620 and a 5G user plane component 625 (e.g., a 5G gateway), and the backhaul interface for one or both of the 5G control plane and the 5G user plane may terminate at the access node controller 610. Additionally, or alternatively, a backhaul interface to one or more neighbor access nodes 630 (e.g., another 5G access node 605 and/or an LTE access node) may terminate at the access node controller 610.

The access node controller 610 may include and/or may communicate with one or more TRPs 635 (e.g., via an F1 Control (F1-C) interface and/or an F1 User (F1-U) interface). A TRP 635 may be a distributed unit (DU) of the distributed RAN 600. In some aspects, a TRP 635 may correspond to a network node 110 described above in connection with FIG. 1. For example, different TRPs 635 may be included in different network nodes 110. Additionally, or alternatively, multiple TRPs 635 may be included in a single network node 110. In some aspects, a network node 110 may include a CU (e.g., access node controller 610) and/or one or more DUs (e.g., one or more TRPs 635). In some cases, a TRP 635 may be referred to as a cell, a panel, an antenna array, or an array.

A TRP 635 may be connected to a single access node controller 610 or to multiple access node controllers 610. In some aspects, a dynamic configuration of split logical functions may be present within the architecture of distributed RAN 600. For example, a packet data convergence protocol (PDCP) layer, a radio link control (RLC) layer, and/or a medium access control (MAC) layer may be configured to terminate at the access node controller 610 or at a TRP 635.

In some aspects, multiple TRPs 635 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 635 may be configured to individually (e.g., using dynamic selection) or jointly (e.g., using joint transmission with one or more other TRPs 635) serve traffic to a UE 120.

As indicated above, FIG. 6 is provided as an example. Other examples may differ from what was described with regard to FIG. 6.

Figure 7:
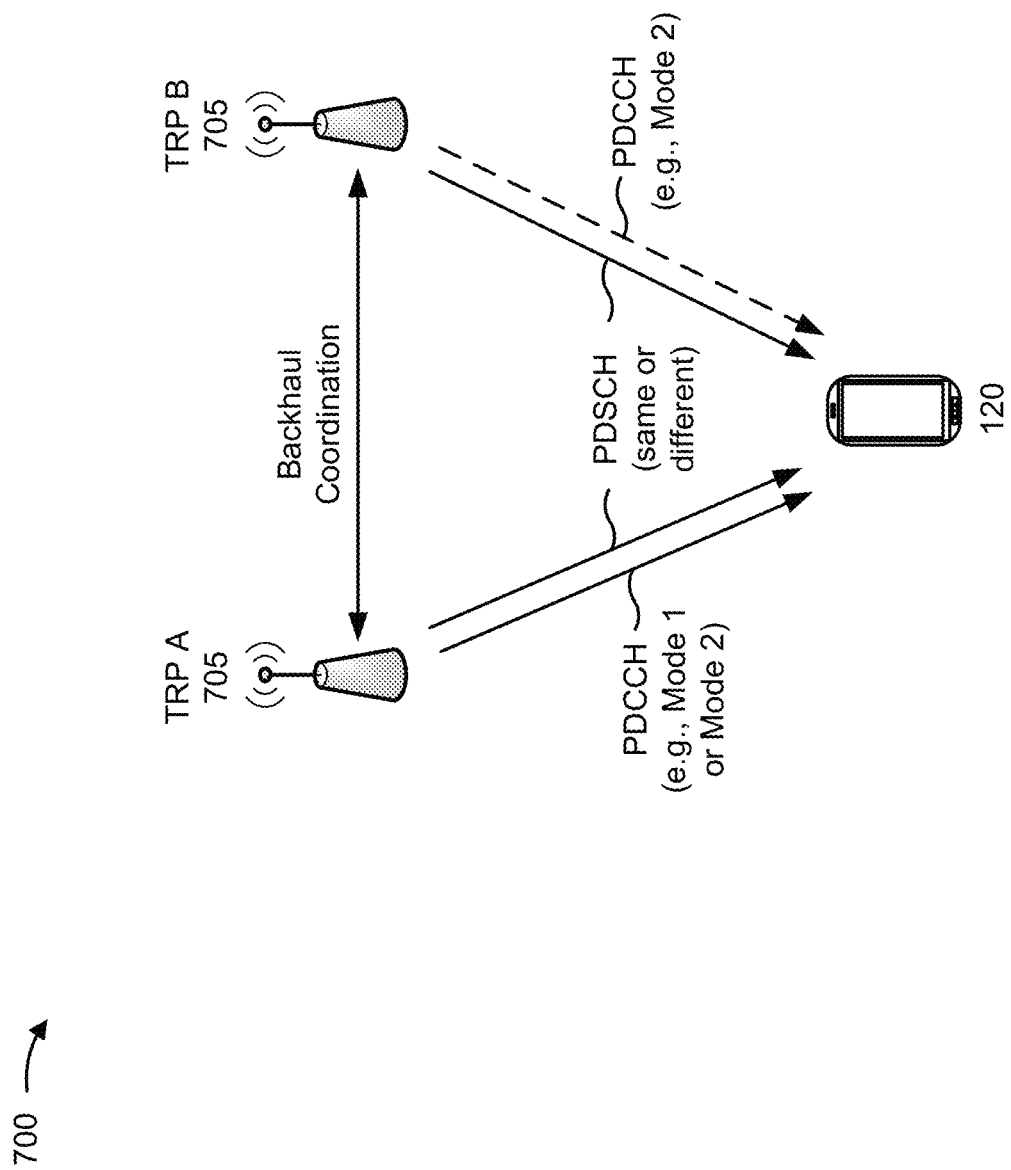
FIG. 7 is a diagram illustrating an example of multiple transmission reception point (TRP) communication, in accordance with the present disclosure.

FIG. 7 is a diagram illustrating an example 700 of multiple TRP (multi-TRP) communication (sometimes referred to as multi-panel communication), in accordance with the present disclosure. As shown in FIG. 7, multiple TRPs 705 may communicate with the same UE 120. A TRP 705 may correspond to a TRP 635 described above in connection with FIG. 6.

The multiple TRPs 705 (shown as TRP A and TRP B) may communicate with the same UE 120 in a coordinated manner (e.g., using coordinated multipoint transmissions) to improve reliability and/or increase throughput. The TRPs 705 may coordinate such communications via an interface between the TRPs 705 (e.g., a backhaul interface and/or an access node controller 610). The interface may have a smaller delay and/or higher capacity when the TRPs 705 are co-located at the same network node 110 (e.g., when the TRPs 705 are different antenna arrays or panels of the same network node 110), and may have a larger delay and/or lower capacity (as compared to co-location) when the TRPs 705 are located at different network nodes 110. The different TRPs 705 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 705 (e.g., TRP A and TRP B) may transmit communications to the UE 120 on the same PDSCH. For example, a communication may be transmitted using a single codeword with different spatial layers for different TRPs 705 (e.g., where one codeword maps to a first set of layers transmitted by a first TRP 705 and maps to a second set of layers transmitted by a second TRP 705). As another example, a communication may be transmitted using multiple codewords, where different codewords are transmitted by different TRPs 705 (e.g., using different sets of layers). In either case, different TRPs 705 may use different QCL relationships (e.g., different TCI states) for different DMRS ports corresponding to different layers. For example, a first TRP 705 may use a first QCL relationship or a first TCI state for a first set of DMRS ports corresponding to a first set of layers, and a second TRP 705 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 705, and a second PDCCH may schedule a second codeword to be transmitted by a second TRP 705. Furthermore, first DCI (e.g., transmitted by the first TRP 705) may schedule a first PDSCH communication associated with a first set of DMRS ports with a first QCL relationship (e.g., indicated by a first TCI state) for the first TRP 705, and second DCI (e.g., transmitted by the second TRP 705) may schedule a second PDSCH communication associated with a second set of DMRS ports with a second QCL relationship (e.g., indicated by a second TCI state) for the second TRP 705. In this case, DCI (e.g., having DCI format 1_0 or DCI format 1_1) may indicate a corresponding TCI state for a TRP 705 corresponding to the DCI. The TCI field of a DCI indicates the corresponding TCI state (e.g., the TCI field of the first DCI indicates the first TCI state and the TCI field of the second DCI indicates the second TCI state).

A network node may dynamically transition one or more TRPs into a dormant state, such as to achieve network energy savings. For example, a network node may dynamically switch between a multi-TRP communication mode and a single-TRP communication mode, such as using a multi-TRP dormancy configuration or a secondary cell (SCell) dormancy configuration. In some examples, TRP dormancy can be indicated explicitly. In some examples, TRP dormancy can be indicated jointly with an SCell dormancy indication. In some examples, SCell dormancy may extend to one or more TRPs in a primary cell. For example, TRP dormancy may be indicated by an SCell dormancy indication applying to a TRP of a primary cell. TRP dormancy may provide network power savings with small signaling overhead and potential UE power usage reduction. The switching of a TRP to a dormant state may impact MIMO communication, since each TRP of a multi-TRP communication mode may support one or more MIMO layers of a multi-layer communication. Thus, when a TRP is transitioned to a dormant state, the number of MIMO layers supportable in the multi-TRP communication mode may decrease. Some techniques described herein enable adaptation of a maximum number of MIMO layers based at least in part on a transition of a TRP to a dormant state.

As indicated above, FIG. 7 is provided as an example. Other examples may differ from what is described with respect to FIG. 7.

Figure 8:
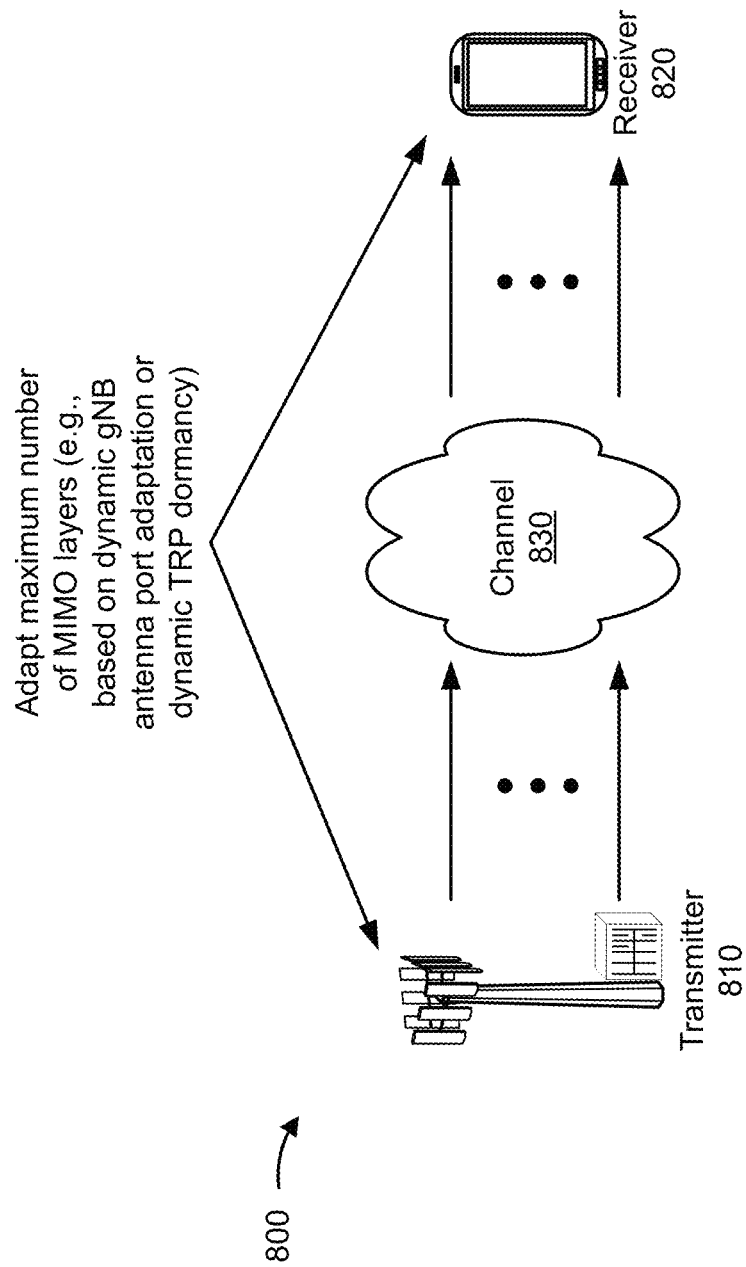
FIG. 8 is a diagram illustrating an example of multiple-input multiple-output (MIMO) communication, in accordance with the present disclosure.

FIG. 8 is a diagram illustrating an example 800 of MIMO communication, in accordance with the present disclosure. As shown, example 800 includes a transmitter 810 (e.g., network node 110, UE 120, a TRP, or the like) and a receiver 820 (e.g., network node 110, UE 120, a TRP, or the like). A channel between the transmitter 810 and the receiver 820 is shown by reference number 830. In this context, the channel is the propagation channel between the transmitter 810 and the receiver 820.

MIMO configurations benefit from multiple antenna elements at the transmitter 810 and multiple antenna elements at the receiver 820. The transmitter may transmit simultaneously into the channel from multiple antenna elements, and the receiver may receive simultaneously on multiple antenna elements. The number of antenna elements at the transmitter 810 and the number of antenna elements at the receiver 820 can be the same number, or can be different numbers. MIMO provides diversity gain, array gain, and spatial multiplexing gain.

A MIMO communication can carry multiple parallel streams of data. A stream of data of a MIMO communication is referred to as a MIMO layer (or just a "layer"). A MIMO communication carrying 2 parallel streams of data has 2 MIMO layers. Using information regarding the state of the channel (which may be derived from a CSI-RS, a demodulation reference signal, or the like), the receiver 820 can reconstruct the MIMO layers of the MIMO communication. The receiver 820 may be configured with a maximum number, of MIMO layers, that indicates a largest number of MIMO layers usable by the transmitter 810.

In some deployments, a maximum number of MIMO layers is RRC configured per cell for downlink transmissions (such as using a maxMIMO-Layers parameter in a PDSCH-ServingCellConfig IE). In some deployments, a maximum number of MIMO layers is RRC configured per downlink bandwidth part (BWP) (such as using a maxMIMO-Layers parameter in a PDSCH-Config IE, where a BWP is a configured set of frequency resources that can be activated or deactivated via dynamic or semi-static signaling). Per-BWP configuration of the maximum number of MIMO layers can allow the possibility for the receiver 820 to operate with a reduced number of antennas and/or receive chains, which can save power in certain scenarios such as low traffic. For example, the network can configure the receiver 820 with two BWPs for different scenarios. A first BWP (e.g., a wideband BWP) may have a larger maximum number of MIMO layers (e.g., 4) suitable for a high data rate, and a second BWP (e.g., a narrowband BWP) may have a smaller maximum number of MIMO layers (e.g., 2) suitable for low traffic and power savings. The receiver 820 may perform BWP switching between these BWPs in different scenarios.

A maximum number of MIMO layers can also be configured for uplink communications. In this example, the transmitter 810 may be a UE and the receiver 820 may be a network node. An uplink communication can include (for example) a codebook-based physical uplink shared channel (PUSCH) communication or a non-codebook-based (NCB) PUSCH transmission. A codebook-based PUSCH communication may use a precoder matrix specified by a codebook. An NCB PUSCH communication may use a precoder matrix derived by the transmitter 810 based at least in part on a sounding reference signal (SRS) resource indicator. In some deployments, the configuration of the maximum number of MIMO layers may be supported per BWP for codebook-based PUSCH transmission using a maxRank field in a pusch-Configs IE. However, for NCB PUSCH transmission, the maximum number of MIMO layers may be configured on a per-cell level using the maxMIMO-Layers field of the PUSCH-ServingCellConfig IE.

A per-BWP MIMO configuration can be implicitly achieved for NCB PUSCH transmission. For example, for NCB uplink transmission, the number of uplink ports from which to transmit is determined based at least in part on one or more indicated SRS resource indicators (SRIs) when multiple SRS resources are configured. The SRI indication depends on a parameter $L_{max}$ (which is defined by maxMIMO-Layers in PUSCH-ServingCellConfig or if not provided, by the UE capability), and the number of SRS resources ($N_{SRS}$), in the associated SRS resource set. The configurations of the number of SRS resources ($N_{SRS}$) with usage "nonCodeBook" may be allowed per each BWP, which implicitly limits the maximum scheduled uplink rank. A "rank" is a value indicating a number of MIMO layers. Thus, for a BWP configured with $N_{SRS}=2$, the maximum uplink rank that can be scheduled is limited to 2.

As noted above, some deployments support per-downlink-BWP configuration of a maximum number of downlink MIMO layers for UE power savings. The per-BWP maxMIMO-layers configuration can allow the possibility for a UE to operate with a reduced number of antennas and/or receive chains and save power in certain scenarios such as low traffic. BWP switching facilitates dynamic switching between the different configurations of the maximum number of downlink MIMO layers.

As described above, a network may support dynamic antenna adaptation, such as for the purpose of achieving network energy savings. As used herein, "dynamic antenna adaptation" can refer to deactivating one or more antenna elements, ports, sub-panels, or panels (as described in connection with FIG. 5), or to transitioning one or more TRPs to a dormant state (as described in connection with FIG. 7). Dynamic antenna adaptation may allow the network to turn off some antenna ports or a TRP in an efficient and dynamic manner when there is no or low user traffic (which itself is dynamic).

As the number of transmit antenna ports or the number of TRPs is reduced (for example, due to dynamic antenna adaptation), the maximum number of MIMO layers supportable on a communication link between a network node and a UE may decrease. In some deployments, the network node may reduce the maximum number of MIMO layers via dynamic BWP switching (between BWPs with different configured maximum numbers of MIMO layers). However, if the network node and/or the UE supports only one BWP, then the reduction of the maximum number of MIMO layers via BWP switching may not work. Furthermore, frequent BWP switching at the UE may be undesirable at the UE, for example, due to the overhead associated with BWP switching and increased scheduling complexity.

Some techniques described herein enable adaptation of a maximum number of MIMO layers, such as in association with dynamic antenna adaptation at a network node. In some examples, the adaptation of the maximum number of MIMO layers may be independent of BWP switching. For example, the adaptation of the maximum number of MIMO layers may be implemented without the UE performing BWP switching (e.g., while the UE remains on a same BWP). In some aspects, the adaptation of the maximum number of MIMO layers is based at least in part on a number of CSI-RS ports associated with the network node (as described in connection with FIG. 9). In some aspects, the adaptation of the maximum number of MIMO layers is based at least in part on a transition of a TRP associated with the network node to or from a dormancy state (as described in connection with FIG. 10). In this way, adaptation of a maximum number of MIMO layers is enabled, such as in connection with dynamic antenna adaptation. In some aspects, adaptation of the maximum number of MIMO layers is enabled without BWP switching, which reduces overhead associated with BWP switching and enables adaptation of the maximum number of MIMO layers for UEs and/or network nodes supporting only a single BWP. In some aspects, adaptation of the maximum number of MIMO layers is enabled without RRC reconfiguration, which reduces overhead and delay associated with adapting the maximum number of MIMO layers.

As indicated above, FIG. 8 is provided as an example. Other examples may differ from what is described with regard to FIG. 8.

Figure 9:
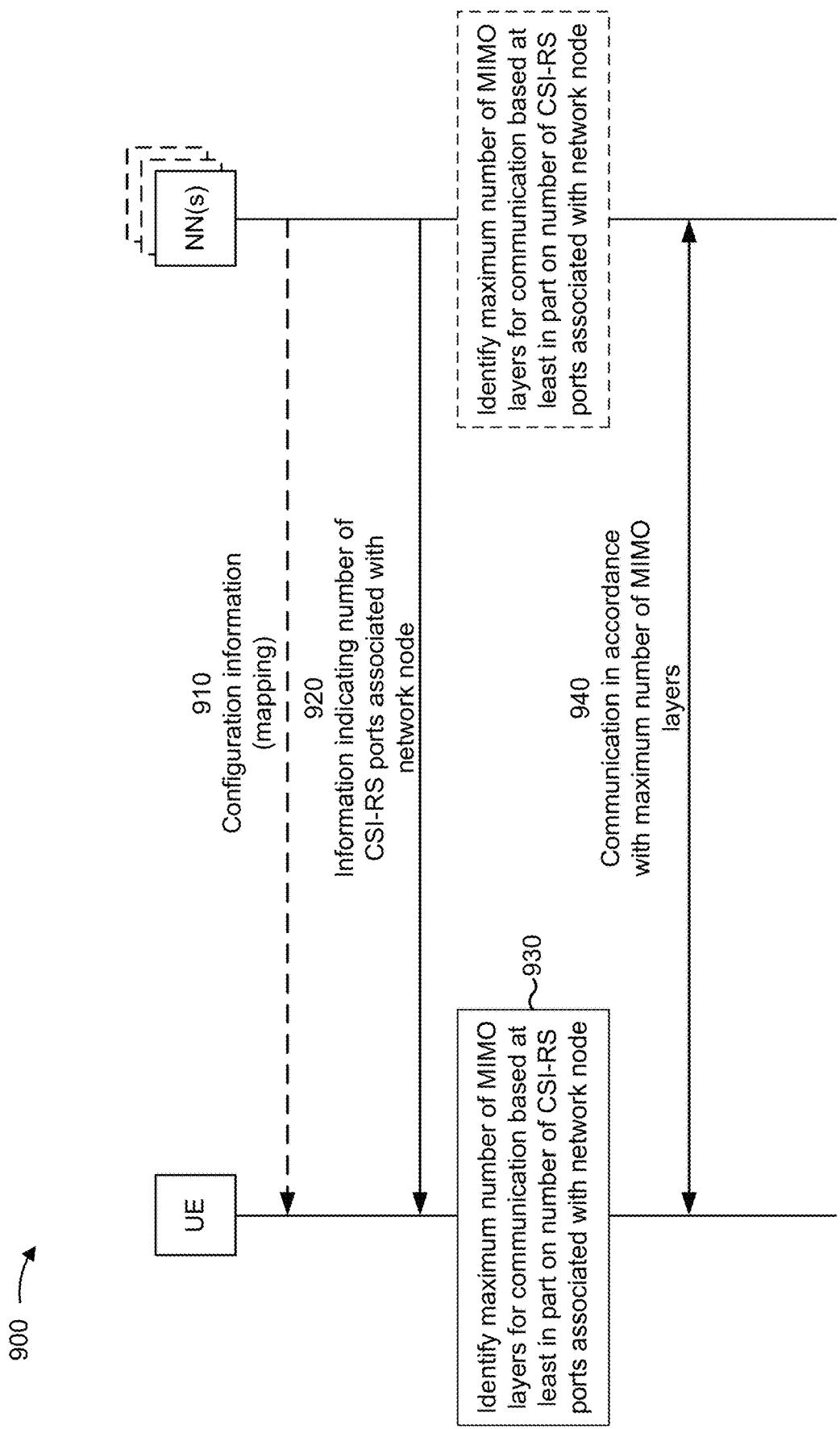
FIG. 9 is a diagram illustrating an example of adaptation of a maximum number of MIMO layers based at least in part on a number of CSI-RS ports associated with a network node, in accordance with the present disclosure.

FIG. 9 is a diagram illustrating an example 900 of adaptation of a maximum number of MIMO layers based at least in part on a number of CSI-RS ports associated with a network node, in accordance with the present disclosure. As shown, example 900 includes a UE (e.g., UE 120, transmitter 810, receiver 820) and a network node (e.g., network node 110, CU 310, DU 330, RU 340, the network node of FIG. 5, 5G access node 605, access node controller (ANC) 610, one or more TRPs 635, one or more TRPs 705, transmitter 810, receiver 820, or a combination thereof).

As shown by reference number 910, in some aspects, the network node may transmit, and the UE may receive, configuration information (e.g., via RRC or medium access control (MAC) signaling). In some aspects, the configuration information may indicate a mapping between a number of CSI-RS ports and a maximum number of MIMO layers. For example, the mapping may indicate, for a given number of CSI-RS ports associated with the network node, a maximum number of MIMO layers or a rule used to determine the maximum number of MIMO layers. In some aspects, the mapping may be fixed. In some aspects, the mapping may be indicated by a table. Two examples of such a table are provided below. In the below examples, "M" indicates a UE capability for a maximum number of MIMO layers. For example, a UE may have a capability for a maximum number of MIMO layers, and may signal UE capability information indicating the maximum number of MIMO layers. The maximum number of MIMO layers supported by a UE can be related to various factors, such as a number of antennas of the UE, a number of transmit chains of the UE, a processing capability of the UE, and so on. These tables are just examples, and different mappings between a number of CSI-RS ports and a maximum number of MIMO layers may be used without departing from the scope of this disclosure.

| Number of CSI-RS ports | Max MIMO layers |
|---|---|
| 32 | M (per UE capability) |
| 16 | M−1 |
| 8 | M−2 |
| 4 | M−3 |
| 2 | 1 |

Example 1

| Number of CSI-RS ports | Max MIMO layers |
|---|---|
| 32 | M (per UE capability) |
| 16 | M/2 |
| 8 | M/2 |
| 4 | M/4 |
| 2 | 1 |

Example 2

Thus, a first number of CSI-RS ports (e.g., 32 CSI-RS ports) is mapped to a first number of MIMO layers (e.g., M layers) and a second number of CSI-RS ports (e.g., 16 CSI-RS ports) is mapped to a second number of MIMO layers (e.g., M−1 layers or M/2 layers), wherein the first number of MIMO layers is larger than the second number of MIMO layers and the first number of CSI-RS ports is larger than the second number of CSI-RS ports. The UE may receive information indicating (e.g., updating) an active number of CSI-RS ports from the first number of CSI-RS ports to the second number of CSI-RS ports (as described below), and may identify a maximum number of MIMO layers as the second number of MIMO layers based at least in part on the information. In some aspects, the mapping may be used to determine an adjustment to a maximum number of MIMO layers. For example, the UE may be configured with an initial maximum number of MIMO layers, or may determine the initial maximum number of MIMO layers according to a configuration of the UE. Upon receiving an indication updating or indicating an active number of CSI-RS ports of the network node, the UE may identify a maximum number of MIMO layers using the mapping.

As shown by reference number 920, in some aspects, the network node may transmit, and the UE may receive, information (e.g., an RRC parameter, dynamic signaling, or another form of signaling) indicating a number of CSI-RS ports associated with the network node. The number of CSI-RS ports may be associated with the network node based at least in part on the number of CSI-RS ports being active (e.g., used for CSI-RS transmission) at the network node. For example, the network node may provide information indicating a number of CSI-RS ports, such as an explicit indication of a number of CSI-RS ports, an adjustment to a number of CSI-RS ports, or the like. In some aspects, the network node may transmit the information indicating the number of CSI-RS ports based at least in part on a modification to the number of CSI-RS ports. For example, the network node may perform dynamic antenna adaptation, thereby changing the number of CSI-RS ports associated with the network node (since the number of active antenna ports changes during dynamic antenna adaptation thereby changing the number of CSI-RS ports supportable by the network node), and may transmit the information indicating the number of CSI-RS ports based at least in part on the dynamic antenna adaptation. In some aspects, the UE may identify a maximum number of MIMO layers based at least in part on the number of CSI-RS ports and the transition of a TRP to or from a dormancy state. For example, the UE may receive an indication of the transition and a number of CSI-RS ports that are active after the transition, and may identify the maximum number of MIMO layers in accordance with the number of CSI-RS ports (as described above) and the reception of indication of the transition.

As shown by reference number 930, the UE (and optionally the network node) may identify a maximum number of MIMO layers for a communication based at least in part on the number of CSI-RS ports associated with the network node. For example, the UE may use a mapping, described in connection with reference number 910, to identify the maximum number of MIMO layers. If, for example, the indication of the number of CSI-RS ports indicates 8 CSI-RS ports, the UE may identify a maximum number of MIMO layers as M−2 or M/2.

In some aspects, the UE and/or the network node may perform adaptation of a maximum number of MIMO layers (e.g., may identify a maximum number of MIMO layers) at a per-BWP granularity or a per-cell granularity, where "cell," in this context, refers to either a TRP or a component carrier. For example, the maximum number of MIMO layers may be identified per BWP, based at least in part on per-bandwidth-part configuration of maximum numbers of MIMO layers being configured if per-bandwidth-part configuration of maximum numbers of MIMO layers is configured. This may be referred to as per-BWP granularity adaptation of the maximum number of MIMO layers. If per-BWP configuration of maximum numbers of MIMO layers is configured, then a BWP may be configured with a maximum number of MIMO layers, and different BWPs may be configured with different maximum number of MIMO layers (e.g., using an RRC parameter indicating a maximum number of MIMO layers for a BWP). As another example, the maximum number of MIMO layers may be identified per cell, based at least in part on per-bandwidth-part configuration of maximum numbers of MIMO layers not being configured if per-bandwidth-part configuration of maximum numbers of MIMO layers is not configured. This may be referred to as per-cell granularity adaptation of the maximum number of MIMO layers. If per-cell configuration of maximum numbers of MIMO layers is configured, then a cell (e.g., carrier, TRP) may be configured with a maximum number of MIMO layers, and different cells may be configured with different maximum number of MIMO layers (e.g., using an RRC parameter indicating a maximum number of MIMO layers for a cell). In some aspects, if per-bandwidth-part configuration of maximum numbers of MIMO layers is configured, the maximum number of MIMO layers is identified based at least in part on a configured maximum number of MIMO layers for a bandwidth part, and if per-bandwidth-part configuration of maximum numbers of MIMO layers is not configured, the maximum number of MIMO layers is identified based at least in part on a configured maximum number of MIMO layers for a cell. Thus, the adaptation of the maximum number of MIMO is applicable to per-BWP configuration of maxMIMO-layers or the maxRank field of pusch-Configs if configured, and otherwise is applicable to the per-cell maxMIMO-layers configuration (if per-BWP configuration is not configured).

As shown by reference number 940, the UE and the network node may perform a communication in accordance with the maximum number of MIMO layers. For example, the UE may transmit an uplink communication (e.g., a PUSCH communication) using at most the maximum number of MIMO layers, and the network node may receive the uplink communication using at most the maximum number of MIMO layers. As another example, the network node may transmit or configure a downlink communication (e.g., a PDSCH communication) using at most the maximum number of MIMO layers, and the UE may receive the downlink communication using at most the maximum number of MIMO layers. In this way, the maximum number of MIMO layers can be adapted based at least in part on the number of CSI-RS ports (e.g., the number of antenna ports) active at the network node, such as without switching BWPs or RRC reconfiguring the UE.

As indicated above, FIG. 9 is provided as an example. Other examples may differ from what is described with regard to FIG. 9.

Figure 10:
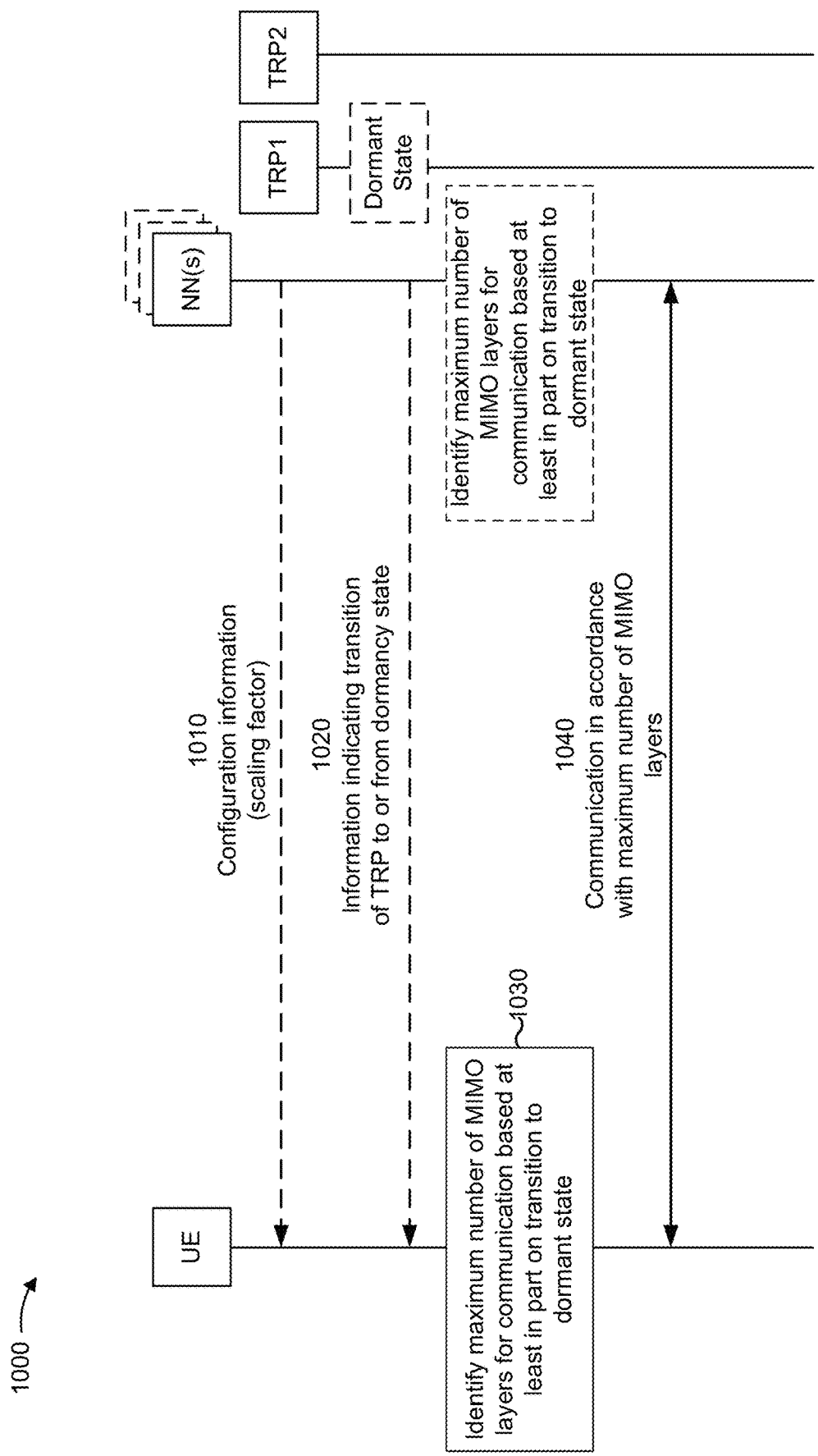
FIG. 10 is a diagram illustrating an example of adaptation of a maximum number of MIMO layers based at least in part on a transition of a TRP to a dormancy state, in accordance with the present disclosure.

FIG. 10 is a diagram illustrating an example 1000 of adaptation of a maximum number of MIMO layers based at least in part on a transition of a TRP to or from a dormancy state, in accordance with the present disclosure. As shown, example 1000 includes a UE (e.g., UE 120, transmitter 810, receiver 820) and a network node (e.g., network node 110, CU 310, DU 330, RU 340, the network node of FIG. 5, 5G access node 605, ANC 610, one or more TRPs 635, one or more TRPs 705, transmitter 810, receiver 820, or a combination thereof). The network node may be associated with two or more TRPs. Dashed arrows indicate optional steps.

As shown by reference number 1010, in some aspects, the network node may transmit, and the UE may receive, configuration information (such as via RRC or MAC signaling). In some aspects, the configuration information may include an indication of a scaling factor (e.g., a scaling factor K) associated with identifying a maximum number of MIMO layers. The UE may continue to use the unscaled maximum number of MIMO layers until an indication of a transition of a TRP associated with the network node to a dormancy state is received. For example, the UE and/or the network node may identify the maximum number of MIMO layers by applying the scaling factor to a prior maximum number of MIMO layers based at least in part on a transition of a TRP associated with the network node to or from a dormancy state. In this example, if the prior maximum number of MIMO layers is 4 and the scaling factor is 2, the UE and/or the network node may identify a maximum number of MIMO layers, based at least in part on a transition of a TRP associated with the network node to or from a dormancy state, as 4/2=2. For another example, the UE and/or the network node may identify the maximum number of MIMO layers by applying the scaling factor to a prior maximum number of MIMO layers based at least in part on a transition of a TRP associated with the network node to an active (non-dormancy) state. In this example, if the prior maximum number of MIMO layers is 2 and the scaling factor is 2, the UE and/or the network node may identify a maximum number of MIMO layers, based at least in part on a transition of a TRP associated with the network node to an active state, as 2*2=4.

As shown by reference number 1020, in some aspects, the network node may transmit, and the UE may receive, information indicating a transition of a TRP to a dormancy state or a non-dormancy state. For example, the information may include or be associated with an SCell dormancy or activation indication, or may not be associated with an SCell dormancy or activation indication. In some aspects, the information may include a TRP dormancy or activation indication, which may be UE-specific or group-specific (e.g., DCI, a wakeup signal, etc.). "Group-specific" signaling is signaling directed to a group of recipients, such as a set of UEs associated with a group identifier, a set of UEs in a particular coverage area, or the like. The UE and/or the network node may identify a maximum number of MIMO layers based at least in part on the information, as described below.

As shown by reference number 1030, the UE may identify a maximum number of MIMO layers for a communication based at least in part on the transition of the TRP associated with the network node to the dormancy state or the active state. In some aspects, the UE and/or the network node may apply the scaling factor described in connection with reference number 1010 in order to identify the maximum number of MIMO layers.

In some aspects, the UE and/or the network node may identify the maximum number of MIMO layers as a maximum number of MIMO layers of a non-dormant TRP associated with the network node. For example, the network node may be associated with two TRPs: a TRP associated with a dormancy state and a non-dormant TRP. In this example, the TRP associated with the dormancy state is associated with a first maximum number of MIMO layers and the non-dormant TRP is associated with a second maximum number of MIMO layers. The UE and the network node may identify the maximum number of MIMO layers for a communication as the second maximum number of MIMO layers (e.g., based at least in part on the information indicating the transition of the TRP to the dormancy state). Thus, the UE and/or the network node may identify the maximum number of MIMO layers based at least in part on a maximum number of MIMO layers associated with an active (e.g., non-dormant) TRP. For example, for a spatial division multiplexing (SDM) mTRP scheme with rank-4 PDSCH transmission by rank-2 (TRP0)+rank-2 (TRP1) or rank-3 (TRP0)+rank-1 (TRP1), if TRP 1 is dormant, the UE may use the rank associated with TRP0 (2 for the 2+2 case or 3 for the 3+1 case) for reception of a PDSCH and/or transmission of a PUSCH. If the network node is associated with more than two TRPs, the UE may identify the maximum number of MIMO layers for a communication as a sum of maximum numbers of MIMO layers of one or more non-dormant TRPs associated with the network node.

In some aspects, the UE and/or the network node may perform adaptation of a maximum number of MIMO layers (e.g., may identify a maximum number of MIMO layers) at a per-BWP granularity or a per-cell granularity. For example, the maximum number of MIMO layers may be identified per BWP, based at least in part on per-bandwidth-part configuration of maximum numbers of MIMO layers being configured if per-bandwidth-part configuration of maximum numbers of MIMO layers is configured. As another example, the maximum number of MIMO layers may be identified per cell, based at least in part on per-bandwidth-part configuration of maximum numbers of MIMO layers not being configured if per-bandwidth-part configuration of maximum numbers of MIMO layers is not configured. In some aspects, if per-bandwidth-part configuration of maximum numbers of MIMO layers is configured, the maximum number of MIMO layers is identified based at least in part on a configured maximum number of MIMO layers for a bandwidth part, and if per-bandwidth-part configuration of maximum numbers of MIMO layers is not configured, the maximum number of MIMO layers is identified based at least in part on a configured maximum number of MIMO layers for a cell. Thus, the adaptation of the maximum number of MIMO is applicable to per-BWP configuration of maxMIMO-layers if configured, and otherwise is applicable to the per-cell maxMIMO-layers configuration (if per-BWP configuration is not configured).

As shown by reference number 1040, the UE and the network node may perform a communication in accordance with the maximum number of MIMO layers. For example, the UE may transmit an uplink communication (e.g., an uplink PUSCH communication) using at most the maximum number of MIMO layers, and the network node may receive the uplink communication using at most the maximum number of MIMO layers. As another example, the network node may transmit or configure a downlink communication (e.g., a downlink PDSCH communication) using at most the maximum number of MIMO layers, and the UE may receive the downlink communication using at most the maximum number of MIMO layers. In this way, the maximum number of MIMO layers can be adapted based at least in part on a dormancy state (or a change in dormancy state) of a TRP, such as without switching BWPs or RRC reconfiguring the UE.

As indicated above, FIG. 10 is provided as an example. Other examples may differ from what is described with regard to FIG. 10.

Figure 11:
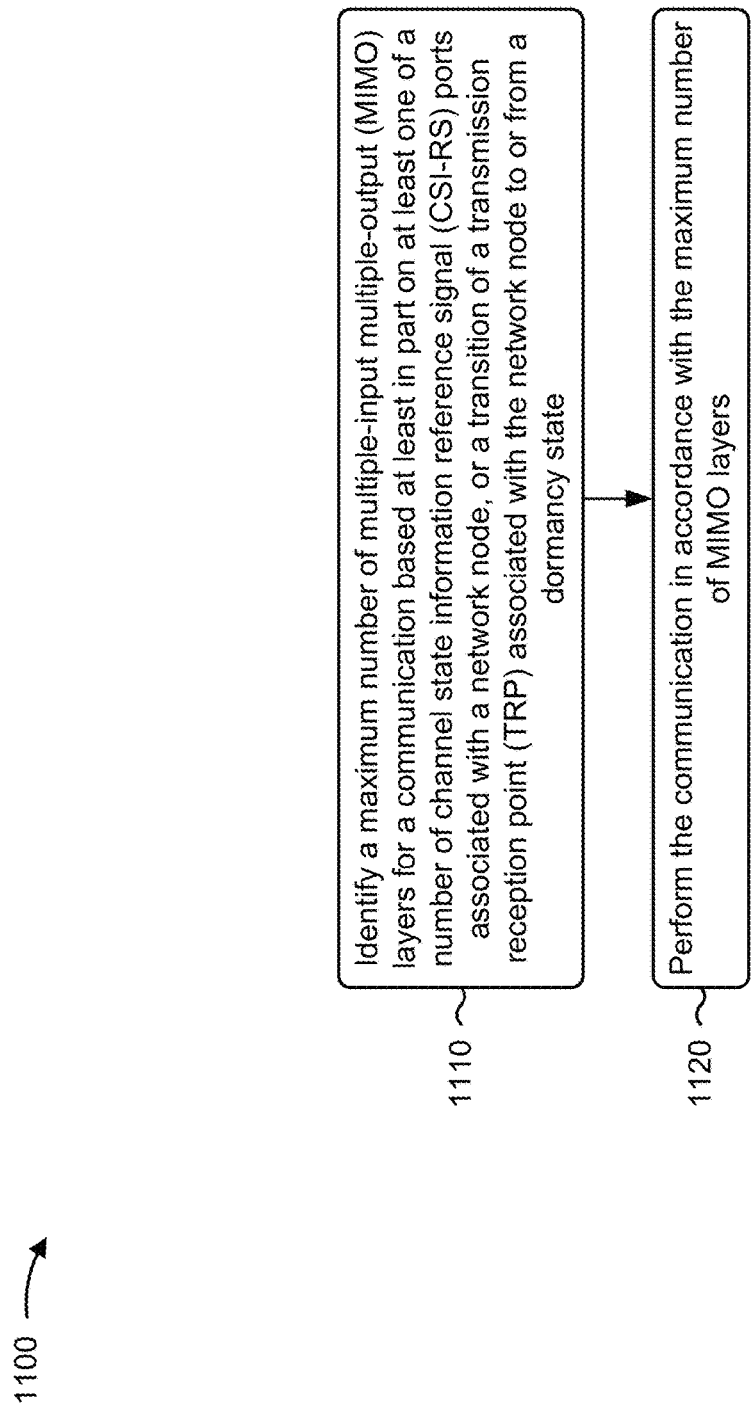
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, transmitter 810, receiver 820) performs operations associated with MIMO layer adaptation.

As shown in FIG. 11, in some aspects, process 1100 may include identifying a maximum number of MIMO layers for a communication based at least in part on at least one of a number of CSI-RS ports associated with a network node, or a transition of a TRP associated with the network node to or from a dormancy state (block 1110). For example, the UE (e.g., using communication manager 140 and/or identification component 1308, depicted in FIG. 13) may identify a maximum number of MIMO layers for a communication based at least in part on at least one of a number of CSI-RS ports associated with a network node, or a transition of a TRP associated with the network node to or from a dormancy state, as described above.

As further shown in FIG. 11, in some aspects, process 1100 may include performing the communication in accordance with the maximum number of MIMO layers (block 1120). For example, the UE (e.g., using communication manager 140 and/or transmission component 1304 or reception component 1302, depicted in FIG. 13) may perform the communication in accordance with the maximum number of MIMO layers, as described above.

Process 1100 may include additional aspects, such as any single aspect or any combination of aspects described below and/or in connection with one or more other processes described elsewhere herein.

In a first aspect, process 1100 includes receiving information indicating the number of CSI-RS ports, wherein identifying the maximum number of MIMO layers is based at least in part on the information.

In a second aspect, alone or in combination with the first aspect, process 1100 includes receiving information indicating the transition of the TRP to the dormancy state, wherein identifying the maximum number of MIMO layers is based at least in part on the information.

In a third aspect, alone or in combination with one or more of the first and second aspects, identifying the maximum number of MIMO layers further comprises identifying the maximum number of MIMO layers in accordance with a mapping between the number of CSI-RS ports and the maximum number of MIMO layers.

In a fourth aspect, alone or in combination with one or more of the first through third aspects, a first number of CSI-RS ports is mapped to a first number of MIMO layers and a second number of CSI-RS ports is mapped to a second number of MIMO layers, wherein the first number of MIMO layers is larger than the second number of MIMO layers and the first number of CSI-RS ports is larger than the second number of CSI-RS ports.

In a fifth aspect, alone or in combination with one or more of the first through fourth aspects, the maximum number of MIMO layers is the second number of MIMO layers and the number of CSI-RS ports associated with the network node is the second number of CSI-RS ports, and process 1100 includes receiving, from the network node, information indicating an active number of CSI-RS ports to the second number of CSI-RS ports, wherein identifying the maximum number of MIMO layers is based at least in part on the information.

In a sixth aspect, alone or in combination with one or more of the first through fifth aspects, process 1100 includes receiving configuration information indicating the mapping.

In a seventh aspect, alone or in combination with one or more of the first through sixth aspects, identifying the maximum number of MIMO layers further comprises identifying the maximum number of MIMO layers as a maximum number of MIMO layers of a non-dormant TRP associated with the network node.

In an eighth aspect, alone or in combination with one or more of the first through seventh aspects, the TRP associated with the dormancy state is associated with a first maximum number of MIMO layers and the non-dormant TRP is associated with a second maximum number of MIMO layers, and the maximum number of MIMO layers for the communication is the second maximum number of MIMO layers.

In a ninth aspect, alone or in combination with one or more of the first through eighth aspects, identifying the maximum number of MIMO layers further comprises identifying the maximum number of MIMO layers by applying a scaling factor to a prior maximum number of MIMO layers based at least in part on the transition of the TRP associated with the network node to the dormancy state.

In a tenth aspect, alone or in combination with one or more of the first through ninth aspects, process 1100 includes receiving an indication of the scaling factor.

In an eleventh aspect, alone or in combination with one or more of the first through tenth aspects, the maximum number of MIMO layers is identified per bandwidth part, based at least in part on per-bandwidth-part configuration of maximum numbers of MIMO layers being configured.

In a twelfth aspect, alone or in combination with one or more of the first through eleventh aspects, the maximum number of MIMO layers is identified per cell, based at least in part on per-bandwidth-part configuration of maximum numbers of MIMO layers not being configured if per-bandwidth-part configuration of maximum numbers of MIMO layers is not configured.

In a thirteenth aspect, alone or in combination with one or more of the first through twelfth aspects, if per-bandwidth-part configuration of maximum numbers of MIMO layers is configured, the maximum number of MIMO layers is identified based at least in part on a configured maximum number of MIMO layers for a bandwidth part, and if per-bandwidth-part configuration of maximum numbers of MIMO layers is not configured, the maximum number of MIMO layers is identified based at least in part on a configured maximum number of MIMO layers for a cell.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
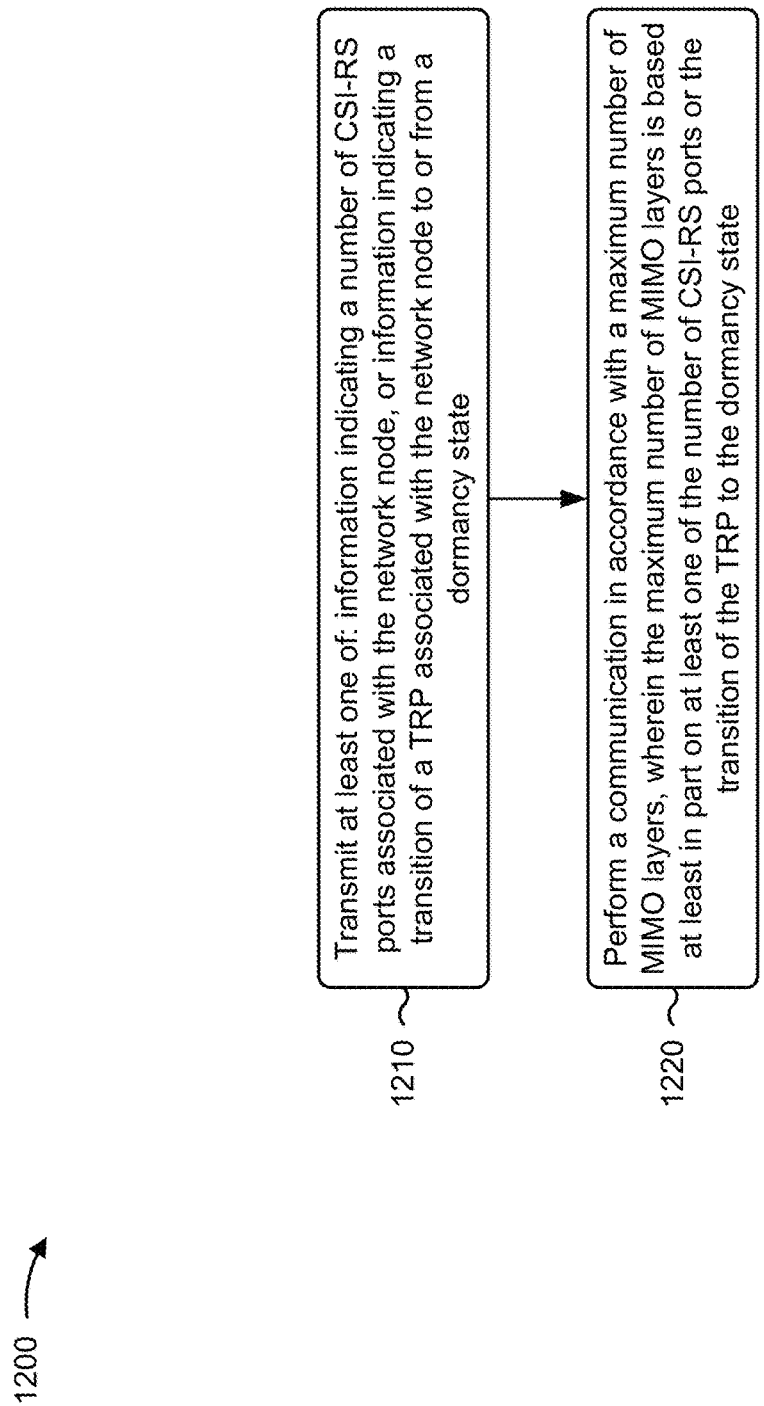
FIG. 12 is a diagram illustrating an example process performed, for example, by a network node, in accordance with the present disclosure.

FIG. 12 is a diagram illustrating an example process 1200 performed, for example, by a network node, in accordance with the present disclosure. Example process 1200 is an example where the network node (e.g., network node 110, CU 310, DU 330, RU 340, the network node of FIG. 5, 5G access node 605, ANC 610, one or more TRPs 635, one or more TRPs 705, transmitter 810, receiver 820, or a combination thereof) performs operations associated with MIMO layer adaptation.

As shown in FIG. 12, in some aspects, process 1200 may include transmitting at least one of: information indicating a number of CSI-RS ports associated with the network node, or information indicating a transition of a TRP associated with the network node to or from a dormancy state (block 1210). For example, the network node (e.g., using communication manager 150 and/or transmission component 1404, depicted in FIG. 14) may transmit at least one of: information indicating a number of CSI-RS ports associated with the network node, or information indicating a transition of a TRP associated with the network node to or from a dormancy state, as described above.

As further shown in FIG. 12, in some aspects, process 1200 may include performing a communication in accordance with a maximum number of MIMO layers, wherein the maximum number of MIMO layers is based at least in part on at least one of the number of CSI-RS ports or the transition of the TRP to the dormancy state (block 1220). For example, the network node (e.g., using communication manager 150, transmission component 1404, and/or reception component 1402, depicted in FIG. 14) may perform a communication in accordance with a maximum number of MIMO layers, wherein the maximum number of MIMO layers is based at least in part on at least one of the number of CSI-RS ports or the transition of the TRP to the dormancy state, as described above.

Process 1200 may include additional aspects, such as any single aspect or any combination of aspects described below and/or in connection with one or more other processes described elsewhere herein.

In a first aspect, the maximum number of MIMO layers is based at least in part on a mapping between the number of CSI-RS ports and the maximum number of MIMO layers.

In a second aspect, alone or in combination with the first aspect, a first number of CSI-RS ports is mapped to a first number of MIMO layers and a second number of CSI-RS ports is mapped to a second number of MIMO layers, wherein the first number of MIMO layers is larger than the second number of MIMO layers and the first number of CSI-RS ports is larger than the second number of CSI-RS ports.

In a third aspect, alone or in combination with one or more of the first and second aspects, process 1200 includes transmitting configuration information indicating the mapping.

In a fourth aspect, alone or in combination with one or more of the first through third aspects, the maximum number of MIMO layers is equal to a maximum number of MIMO layers of a non-dormant TRP associated with the network node.

In a fifth aspect, alone or in combination with one or more of the first through fourth aspects, the TRP associated with the dormancy state is associated with a first maximum number of MIMO layers and the non-dormant TRP is associated with a second maximum number of MIMO layers, and the maximum number of MIMO layers for the communication is the second maximum number of MIMO layers.

In a sixth aspect, alone or in combination with one or more of the first through fifth aspects, the maximum number of MIMO layers is determined by applying a scaling factor to a prior maximum number of MIMO layers based at least in part on the transition of the TRP associated with the network node to the dormancy state.

In a seventh aspect, alone or in combination with one or more of the first through sixth aspects, process 1200 includes transmitting an indication of the scaling factor.

In an eighth aspect, alone or in combination with one or more of the first through seventh aspects, the maximum number of MIMO layers is identified per bandwidth part, based at least in part on per-bandwidth-part configuration of maximum numbers of MIMO layers being configured if per-bandwidth-part configuration of maximum numbers of MIMO layers is configured.

In a ninth aspect, alone or in combination with one or more of the first through eighth aspects, the maximum number of MIMO layers is identified per cell, based at least in part on per-bandwidth-part configuration of maximum numbers of MIMO layers being configured if per-bandwidth-part configuration of maximum numbers of MIMO layers is not configured.

In a tenth aspect, alone or in combination with one or more of the first through ninth aspects, if per-bandwidth-part configuration of maximum numbers of MIMO layers is configured, the maximum number of MIMO layers is identified based at least in part on a configured maximum number of MIMO layers for a bandwidth part, and if per-bandwidth-part configuration of maximum numbers of MIMO layers is not configured, the maximum number of MIMO layers is identified based at least in part on a configured maximum number of MIMO layers for a cell.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
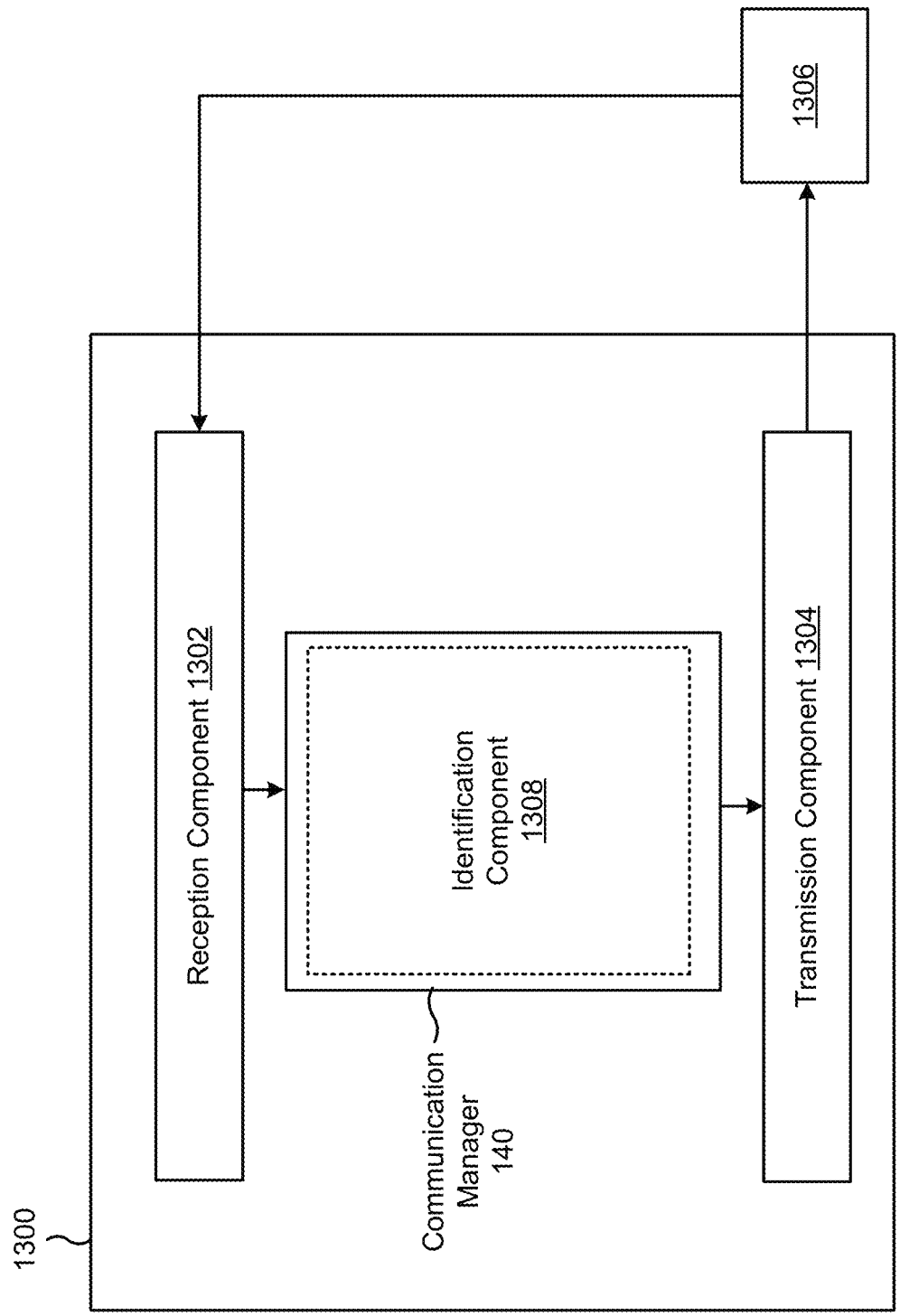
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a identification component 1308, among other examples.

In some aspects, the apparatus 1300 may be configured to perform one or more operations described herein in connection with FIGS. 3-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The identification component 1308 may identify a maximum number of MIMO layers for a communication based at least in part on at least one of a number of CSI-RS ports associated with a network node, or a transition of a TRP associated with the network node to or from a dormancy state. The reception component 1302 or the transmission component 1304 may perform the communication in accordance with the maximum number of MIMO layers.

The reception component 1302 may receive information indicating the number of CSI-RS ports, wherein identifying the maximum number of MIMO layers is based at least in part on the information.

The reception component 1302 may receive information indicating the transition of the TRP to the dormancy state, wherein identifying the maximum number of MIMO layers is based at least in part on the information.

The reception component 1302 may receive configuration information indicating the mapping.

The reception component 1302 may receive an indication of the scaling factor.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
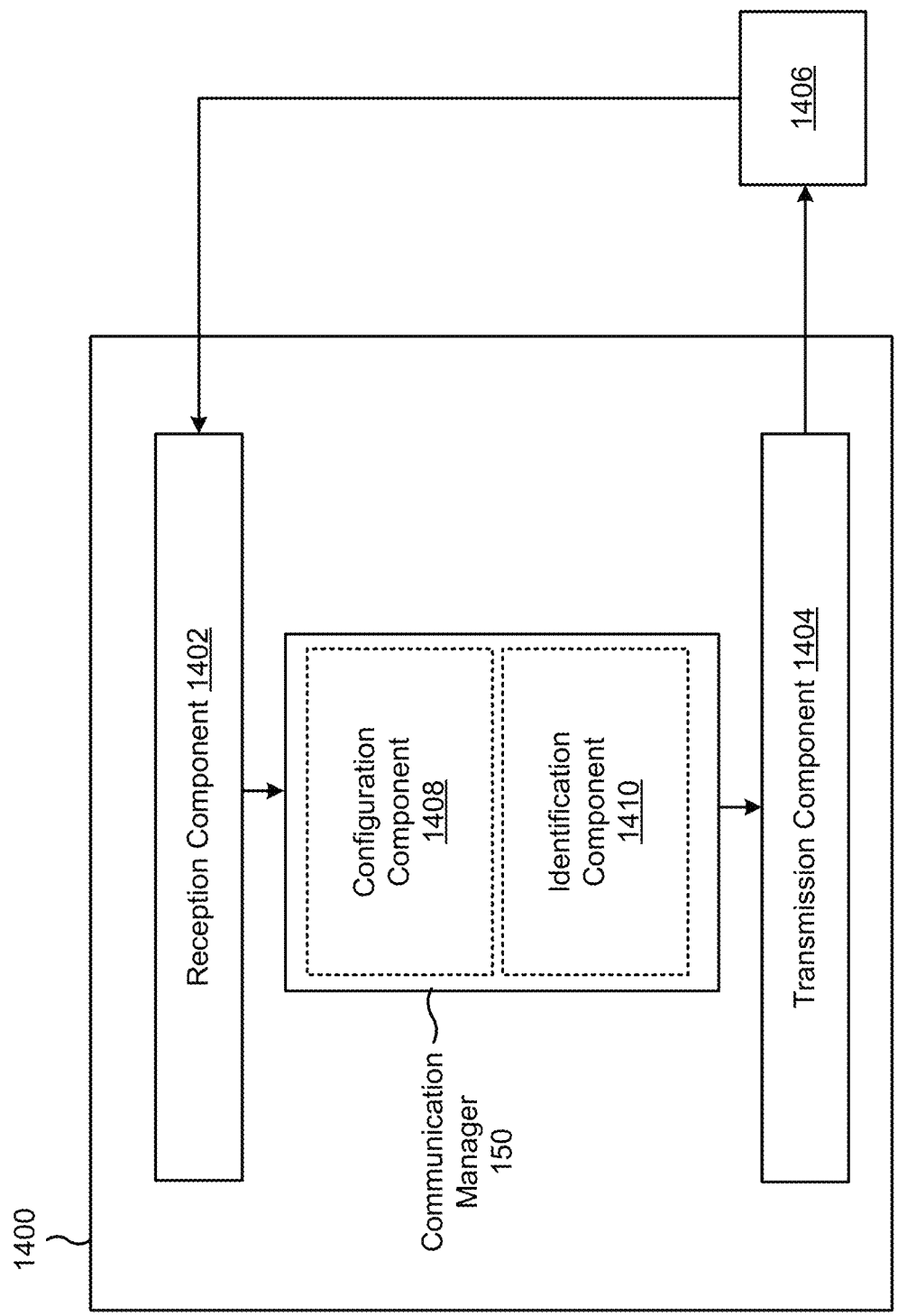
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include one or more of a configuration component 1408 or an identification component 1410, among other examples.

In some aspects, the apparatus 1400 may be configured to perform one or more operations described herein in connection with FIGS. 3-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit at least one of: information indicating a number of CSI-RS ports associated with the network node, or information indicating a transition of a TRP associated with the network node to or from a dormancy state. The transmission component 1404 or the reception component 1402 may perform a communication in accordance with a maximum number of MIMO layers, wherein the maximum number of MIMO layers is based at least in part on at least one of the number of CSI-RS ports or the transition of the TRP to the dormancy state.

The configuration component 1408 may transmit configuration information indicating the mapping.

The configuration component 1408 may transmit an indication of the scaling factor.

The identification component 1410 may identify a maximum number of MIMO layers.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: identifying a maximum number of multiple-input multiple-output (MIMO) layers for a communication based at least in part on at least one of a number of channel state information reference signal (CSI-RS) ports associated with a network node, or a transition of a transmission reception point (TRP) associated with the network node to or from a dormancy state; and performing the communication in accordance with the maximum number of MIMO layers.

Aspect 2: The method of Aspect 1, further comprising: receiving information indicating the number of CSI-RS ports, wherein identifying the maximum number of MIMO layers is based at least in part on the information.

Aspect 3: The method of Aspect 1, further comprising: receiving information indicating the transition of the TRP to or from the dormancy state, wherein identifying the maximum number of MIMO layers is based at least in part on the information.

Aspect 4: The method of any of Aspects 1-2, wherein identifying the maximum number of MIMO layers further comprises: identifying the maximum number of MIMO layers in accordance with a mapping between the number of CSI-RS ports and the maximum number of MIMO layers.

Aspect 5: The method of Aspect 4, wherein a first number of CSI-RS ports is mapped to a first number of MIMO layers and a second number of CSI-RS ports is mapped to a second number of MIMO layers, wherein the first number of MIMO layers is larger than the second number of MIMO layers and the first number of CSI-RS ports is larger than the second number of CSI-RS ports.

Aspect 6: The method of Aspect 5, wherein the maximum number of MIMO layers is the second number of MIMO layers and the number of CSI-RS ports associated with the network node is the second number of CSI-RS ports, wherein the method further comprises: receiving, from the network node, information indicating an active number of CSI-RS ports to the second number of CSI-RS ports, wherein identifying the maximum number of MIMO layers is based at least in part on the information.

Aspect 7: The method of any of Aspects 4-7, further comprising: receiving configuration information indicating the mapping.

Aspect 8: The method of either of Aspects 1 or 3, wherein identifying the maximum number of MIMO layers further comprises: identifying the maximum number of MIMO layers as a sum of maximum numbers of MIMO layers of one or more non-dormant TRPs associated with the network node.

Aspect 9: The method of Aspect 1, wherein the network node is associated with two TRPs, wherein a TRP associated with the dormancy state is associated with a first maximum number of MIMO layers and a non-dormant TRP is associated with a second maximum number of MIMO layers, and wherein the maximum number of MIMO layers for the communication is the second maximum number of MIMO layers.

Aspect 10: The method of any of Aspects 1, 3, 8-9, wherein identifying the maximum number of MIMO layers further comprises: identifying the maximum number of MIMO layers by applying a scaling factor to a prior maximum number of MIMO layers based at least in part on the transition of the TRP associated with the network node to or from the dormancy state.

Aspect 11: The method of Aspect 10, further comprising: receiving an indication of the scaling factor.

Aspect 12: The method of any of Aspects 1-11, wherein the maximum number of MIMO layers is identified per bandwidth part, based at least in part on per-bandwidth-part configuration of maximum numbers of MIMO layers being configured.

Aspect 13: The method of any of Aspects 1-11, wherein the maximum number of MIMO layers is identified per cell, based at least in part on per-bandwidth-part configuration of maximum numbers of MIMO layers not being configured.

Aspect 14: The method of any of Aspects 1-11, wherein: if per-bandwidth-part configuration of maximum numbers of MIMO layers is configured, the maximum number of MIMO layers is identified based at least in part on a configured maximum number of MIMO layers for a bandwidth part, and if per-bandwidth-part configuration of maximum numbers of MIMO layers is not configured, the maximum number of MIMO layers is identified based at least in part on a configured maximum number of MIMO layers for a cell.

Aspect 15: A method of wireless communication performed by a network node, comprising: transmitting at least one of: information indicating a number of channel state information reference signal (CSI-RS) ports associated with the network node, or information indicating a transition of a transmission reception point (TRP) associated with the network node to or from a dormancy state; and performing a communication in accordance with a maximum number of multiple-input multiple-output (MIMO) layers, wherein the maximum number of MIMO layers is based at least in part on at least one of the number of CSI-RS ports or the transition of the TRP to the dormancy state.

Aspect 16: The method of Aspect 15, wherein the maximum number of MIMO layers is based at least in part on a mapping between the number of CSI-RS ports and the maximum number of MIMO layers.

Aspect 17: The method of Aspect 16, wherein a first number of CSI-RS ports is mapped to a first number of MIMO layers and a second number of CSI-RS ports is mapped to a second number of MIMO layers, wherein the first number of MIMO layers is larger than the second number of MIMO layers and the first number of CSI-RS ports is larger than the second number of CSI-RS ports.

Aspect 18: The method of Aspect 16, further comprising: transmitting configuration information indicating the mapping.

Aspect 19: The method of Aspect 15, wherein the maximum number of MIMO layers is equal to a sum of maximum numbers of MIMO layers of one or more non-dormant TRPs associated with the network node.

Aspect 20: The method of Aspect 19, wherein network node is associated with two TRPs, wherein a the TRP associated with the dormancy state is associated with a first maximum number of MIMO layers and a non-dormant TRP is associated with a second maximum number of MIMO layers, and wherein the maximum number of MIMO layers for the communication is the second maximum number of MIMO layers.

Aspect 21: The method of Aspect 15, wherein the maximum number of MIMO layers is determined by applying a scaling factor to a prior maximum number of MIMO layers based at least in part on the transition of the TRP associated with the network node to the dormancy state.

Aspect 22: The method of Aspect 21, further comprising: transmitting an indication of the scaling factor.

Aspect 23: The method of any of Aspects 15-22, wherein the maximum number of MIMO layers is identified per bandwidth part, based at least in part on per-bandwidth-part configuration of maximum numbers of MIMO layers being configured.

Aspect 24: The method of any of Aspects 15-22, wherein the maximum number of MIMO layers is identified per cell, based at least in part on per-bandwidth-part configuration of maximum numbers of MIMO layers being configured.

Aspect 25: The method of any of Aspects 15-22, wherein: if per-bandwidth-part configuration of maximum numbers of MIMO layers is configured, the maximum number of MIMO layers is identified based at least in part on a configured maximum number of MIMO layers for a bandwidth part, and if per-bandwidth-part configuration of maximum numbers of MIMO layers is not configured, the maximum number of MIMO layers is identified based at least in part on a configured maximum number of MIMO layers for a cell.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:
    one or more memories; and
    one or more processors, coupled to the one or more memories, configured to:
        identify a maximum number of multiple-input multiple-output (MIMO) layers for a communication based at least in part on a transition of a transmission reception point (TRP) associated with a network node to or from a dormancy state; and
        perform the communication in accordance with the maximum number of MIMO layers, wherein a first bandwidth part (BWP) is configured with the maximum number of MIMO layers and a second BWP is configured with a different maximum number of MIMO layers, or a first cell is configured with the maximum number of MIMO layers and a second cell is configured with the different maximum number of MIMO layers, or any combination thereof.

2. The apparatus of claim 1, wherein the one or more processors are further configured to:
    receive information indicating a number of channel state information reference signal (CSI-RS) ports, wherein identifying the maximum number of MIMO layers is based at least in part on the information.

3. The apparatus of claim 1, wherein the one or more processors are further configured to:
    receive information indicating the transition of the TRP to or from the dormancy state, wherein identifying the maximum number of MIMO layers is based at least in part on the information.

4. The apparatus of claim 1, wherein the one or more processors, to identify the maximum number of MIMO layers, are configured to:
    identify the maximum number of MIMO layers in accordance with a mapping between a number of channel state information reference signal (CSI-RS) ports and the maximum number of MIMO layers.

5. The apparatus of claim 4, wherein a first number of CSI-RS ports is mapped to a first number of MIMO layers and a second number of CSI-RS ports is mapped to a second number of MIMO layers, wherein the first number of MIMO layers is larger than the second number of MIMO layers and the first number of CSI-RS ports is larger than the second number of CSI-RS ports.

6. The apparatus of claim 5, wherein the maximum number of MIMO layers is the second number of MIMO layers and the number of CSI-RS ports is the second number of CSI-RS ports, wherein the one or more processors are configured to:
    receive, from the network node, information indicating an active number of CSI-RS ports to the second number of CSI-RS ports, wherein identifying the maximum number of MIMO layers is based at least in part on the information.

7. The apparatus of claim 4, wherein the one or more processors are further configured to:
    receive configuration information indicating the mapping.

8. The apparatus of claim 1, wherein the one or more processors, to identify the maximum number of MIMO layers, are configured to:
    identify the maximum number of MIMO layers as a sum of maximum numbers of MIMO layers of one or more non-dormant TRPs associated with the network node.

9. The apparatus of claim 1, wherein the network node is associated with two TRPs, wherein a TRP associated with the dormancy state is associated with a first maximum number of MIMO layers and a non-dormant TRP is associated with a second maximum number of MIMO layers, and wherein the maximum number of MIMO layers for the communication is the second maximum number of MIMO layers.

10. The apparatus of claim 1, wherein the one or more processors, to identify the maximum number of MIMO layers, are configured to:
    identify the maximum number of MIMO layers by applying a scaling factor to a prior maximum number of MIMO layers based at least in part on the transition of the TRP associated with the network node to or from the dormancy state.

11. The apparatus of claim 10, wherein the one or more processors are further configured to:
    receive an indication of the scaling factor.

12. The apparatus of claim 1, wherein the maximum number of MIMO layers is per BWP, based at least in part on per-BWP configuration of maximum numbers of MIMO layers being configured.

13. The apparatus of claim 1, wherein the maximum number of MIMO layers is identified per cell, based at least in part on per-BWP configuration of maximum numbers of MIMO layers not being configured.

14. The apparatus of claim 1, wherein:
if per-BWP configuration of maximum numbers of MIMO layers is configured, the maximum number of MIMO layers is based at least in part on a configured maximum number of MIMO layers for the first BWP, and
if the per-BWP configuration of maximum numbers of MIMO layers is not configured, the maximum number of MIMO layers is based at least in part on a configured maximum number of MIMO layers for the first cell.

15. A network node for wireless communication, comprising:
one or more memories; and
one or more processors, coupled to the one or more memories, configured to:
transmit information indicating a transition of a transmission reception point (TRP) associated with the network node to or from a dormancy state; and
perform a communication in accordance with a maximum number of multiple-input multiple-output (MIMO) layers, wherein the maximum number of MIMO layers is based at least in part on the transition of the TRP to the dormancy state, wherein a first bandwidth part (BWP) is configured with the maximum number of MIMO layers and a second BWP is configured with a different maximum number of MIMO layers, or a first cell is configured with the maximum number of MIMO layers and a second cell is configured with the different maximum number of MIMO layers, or any combination thereof.

16. The network node of claim 15, wherein the maximum number of MIMO layers is based at least in part on a mapping between a number of channel state information reference signal (CSI-RS) ports and the maximum number of MIMO layers.

17. The network node of claim 16, wherein a first number of CSI-RS ports is mapped to a first number of MIMO layers and a second number of CSI-RS ports is mapped to a second number of MIMO layers, wherein the first number of MIMO layers is larger than the second number of MIMO layers and the first number of CSI-RS ports is larger than the second number of CSI-RS ports.

18. The network node of claim 16, wherein the one or more processors are further configured to:
transmit configuration information indicating the mapping.

19. The network node of claim 15, wherein the maximum number of MIMO layers is equal to a sum of maximum numbers of MIMO layers of one or more non-dormant TRPs associated with the network node.

20. The network node of claim 19, wherein the network node is associated with two TRPs, wherein a TRP associated with the dormancy state is associated with a first maximum number of MIMO layers and a non-dormant TRP is associated with a second maximum number of MIMO layers, and wherein the maximum number of MIMO layers for the communication is the second maximum number of MIMO layers.

21. The network node of claim 15, wherein the maximum number of MIMO layers is based at least in part on a scaling factor applied to a prior maximum number of MIMO layers based at least in part on the transition of the TRP associated with the network node to the dormancy state.

22. The network node of claim 21, wherein the one or more processors are further configured to:
transmit an indication of the scaling factor.

23. The network node of claim 15, wherein the maximum number of MIMO layers is identified per BWP, based at least in part on per-BWP configuration of maximum numbers of MIMO layers being configured.

24. The network node of claim 15, wherein the maximum number of MIMO layers is per cell, based at least in part on per-BWP configuration of maximum numbers of MIMO layers not being configured.

25. The network node of claim 15, wherein:
if per-BWP configuration of maximum numbers of MIMO layers is configured, the maximum number of MIMO layers is based at least in part on a configured maximum number of MIMO layers for the first BWP, and
if the per-BWP configuration of maximum numbers of MIMO layers is not configured, the maximum number of MIMO layers is based at least in part on a configured maximum number of MIMO layers for the first cell.

26. A method of wireless communication performed by a user equipment (UE), comprising:
identifying a maximum number of multiple-input multiple-output (MIMO) layers for a communication based at least in part on a transition of a transmission reception point (TRP) associated with a network node to or from a dormancy state; and
performing the communication in accordance with the maximum number of MIMO layers, wherein a first bandwidth part (BWP) is configured with the maximum number of MIMO layers and a second BWP is configured with a different maximum number of MIMO layers, or a first cell is configured with the maximum number of MIMO layers and a second cell is configured with the different maximum number of MIMO layers, or any combination thereof.

27. The method of claim 26, further comprising:
receiving information indicating a number of channel state information reference signal (CSI-RS) ports, wherein identifying the maximum number of MIMO layers is based at least in part on the information.

28. The method of claim 26, further comprising:
receiving information indicating the transition of the TRP to or from the dormancy state, wherein identifying the maximum number of MIMO layers is based at least in part on the information.

29. A method of wireless communication performed by a network node, comprising:
transmitting information indicating a transition of a transmission reception point (TRP) associated with the network node to or from a dormancy state; and
performing a communication in accordance with a maximum number of multiple-input multiple-output (MIMO) layers, wherein the maximum number of MIMO layers is based at least in part on the transition of the TRP to the dormancy state, wherein a first bandwidth part (BWP) is configured with the maximum number of MIMO layers and a second BWP is configured with a different maximum number of MIMO layers, or a first cell is configured with the maximum number of MIMO layers and a second cell is configured with the different maximum number of MIMO layers, or any combination thereof.

30. The method of claim 29, wherein the maximum number of MIMO layers is based at least in part on a mapping between a number of channel state information reference signal (CSI-RS) ports and the maximum number of MIMO layers.

* * * * *